US011921218B2

(12) United States Patent
Heling et al.

(10) Patent No.: US 11,921,218 B2
(45) Date of Patent: Mar. 5, 2024

(54) MARINE VESSEL LIDAR SYSTEM

(71) Applicant: Garmin Switzerland GmbH, Schaffhausen (CH)

(72) Inventors: Eric W. Heling, Overland Park, KS (US); Robert A. Lewis, Bend, OR (US); Joseph P. Durand, III, Overland Park, KS (US)

(73) Assignee: Garmin Switzerland GmbH (CH)

( * ) Notice: Subject to any disclaimer, the term of this patent is extended or adjusted under 35 U.S.C. 154(b) by 876 days.

(21) Appl. No.: 16/700,595

(22) Filed: Dec. 2, 2019

(65) Prior Publication Data

US 2021/0088667 A1 Mar. 25, 2021

Related U.S. Application Data

(60) Provisional application No. 62/773,780, filed on Nov. 30, 2018.

(51) Int. Cl.
*B63B 49/00* (2006.01)
*G01S 7/481* (2006.01)
(Continued)

(52) U.S. Cl.
CPC .............. *G01S 17/93* (2013.01); *B63B 49/00* (2013.01); *G01S 7/4817* (2013.01); *G01S 17/89* (2013.01); *G01S 17/88* (2013.01)

(58) Field of Classification Search
CPC .. B63B 43/00; G02B 19/004; G02B 19/0085; G05D 1/02; G05D 1/0206; G05D 1/0208;
(Continued)

(56) References Cited

U.S. PATENT DOCUMENTS 7,708,434 B2 * 5/2010 Moizard ................ B60Q 1/085
362/466
8,622,778 B2 1/2014 Tyers et al.
(Continued)

FOREIGN PATENT DOCUMENTS

CA   2824606 A1 * 7/2012 ............. B25J 19/02
CN  110622029 B * 3/2021 ............. G01S 17/10
(Continued)

OTHER PUBLICATIONS

Autonomous Vehicles Mapping Plitvice Lakes National Park, Croatia by Nadir Kapetanović et al; Remote Sens. 2020, 12(22), 3683; https://doi.org/10.3390/rs12223683 (Year: 2020).*
(Continued)

*Primary Examiner* — Cuong H Nguyen
(74) *Attorney, Agent, or Firm* — Samuel M. Korte; Max M. Ali

(57) ABSTRACT

Techniques are disclosed to enable an electronic system for use in connection with navigating a marine vessel to a desired position with respect to a waterline boundary. The system has one or potentially more light detection ranging (LIDAR) sensors for detecting structures across a region by vertically scanning the region using the LIDAR sensors. The system also includes a memory element configured to store characteristics of the detected structure. Additionally, the system includes a processing element that can identify a primary reference point associated with navigation of the marine vessel to the desired position based on the characteristics of the detected structure and display information about a current position of the marine vessel in relation to the desired position.

20 Claims, 16 Drawing Sheets

(51) Int. Cl.
*G01S 17/89* (2020.01)
*G01S 17/93* (2020.01)
*G01S 17/88* (2006.01)

(58) Field of Classification Search
CPC .......... G01S 17/42; G01S 17/00; G01S 17/06;
G01S 17/48; G01S 17/88; G01S 17/89;
G06T 17/05; G06S 7/4817; G06S 19/14;
G01C 21/203; B63H 2025/022
USPC ........................................................... 701/21
See application file for complete search history.

(56) References Cited

U.S. PATENT DOCUMENTS

| | | | |
|---|---|---|---|
| 8,994,925 | B2 | 3/2015 | Lewis |
| 9,581,684 | B2 | 2/2017 | Lewis |
| 9,658,322 | B2 | 5/2017 | Lewis |
| 9,778,657 | B2 | 10/2017 | Tyers |
| 9,869,754 | B1 * | 1/2018 | Campbell ............ G01S 7/4817 |
| 10,281,917 | B2 | 5/2019 | Tyers |
| 10,471,992 | B2 * | 11/2019 | Brennan ................ B62D 13/06 |
| 11,029,686 | B2 | 6/2021 | Tyers |
| 11,480,956 | B2 * | 10/2022 | Pritchard ........... G05B 23/0254 |
| 11,480,965 | B2 | 10/2022 | Tyers |
| 2016/0031536 | A1 * | 2/2016 | Kim ........................ B63B 49/00 701/21 |
| 2017/0131718 | A1 * | 5/2017 | Matsumura ............ H04N 5/332 |
| 2018/0004209 | A1 * | 1/2018 | Akuzawa .............. G05D 1/0206 |
| 2018/0127027 | A1 * | 5/2018 | Brennan ................ B62D 13/06 |
| 2018/0128905 | A1 * | 5/2018 | Cheong .................. G01S 17/42 |
| 2018/0143300 | A1 * | 5/2018 | Dussan ................ G01S 17/931 |
| 2018/0143302 | A1 * | 5/2018 | Osiroff ................ G01S 7/4812 |
| 2018/0180736 | A1 * | 6/2018 | Masuda ................. G01S 17/87 |
| 2018/0201348 | A1 * | 7/2018 | Delay .................. G05D 1/0206 |
| 2018/0372875 | A1 * | 12/2018 | Juelsgaard ............ G01S 7/4815 |
| 2018/0374357 | A1 * | 12/2018 | Hosokawa ............. G08G 1/162 |
| 2021/0396858 | A1 * | 12/2021 | Stricker-Shaver ...... G01S 17/10 |

FOREIGN PATENT DOCUMENTS

| | | | | |
|---|---|---|---|---|
| CN | 113928526 A | * | 1/2022 | ............ B63B 49/00 |
| EP | 1923262 A1 | * | 5/2008 | ............ B60Q 1/085 |
| EP | 3283358 B1 | * | 6/2021 | ............ B60W 30/06 |
| NO | 332432 B1 | * | 9/2012 | ............ A43B 5/145 |
| WO | WO-2012010772 A1 | * | 1/2012 | ............ B60N 2/012 |
| WO | WO-2013175022 A1 | * | 11/2013 | ............ G06T 17/05 |
| WO | WO-2016168650 A1 | * | 10/2016 | ............ B60W 30/06 |

OTHER PUBLICATIONS

Effective Waterline Detection of Unmanned Surface Vehicles Based on Optical Images by Yangjie Wei and Yuwei Zhang; Sensors 2016, 16(10), 1590; https://doi.org/10.3390/s16101590; Published: Sep. 27, 2016. 1 (Year: 2016).*
An abstract of "Shoreline extraction from light detection and ranging digital elevation model data and aerial images" by Amr H. Yousef, Khan M. Iftekharuddin, and Mohammad A. Karim; Optical Engineering, vol. 53, Issue 1, 011006 (Year: 2013).*
Printout from https://oceanservice.noaa.gov/facts/lidar.html published prior to Dec. 2, 2019.
Printout from https://www.extremetech.com/extreme/186160-what-are-surround-view-cameras-and-why-are-they-better-than-they-need-to-be published prior to Dec. 2, 2019.
Printout from https://www.flir.com/marine/recreational-boating/ published prior to Dec. 2, 2019.
Printout from https://www.fujitsu.com/us/Images/360_OmniView_AppNote.pdf published prior to Dec. 2, 2019.

* cited by examiner

| | LIDAR | Camera | RADAR | Ultrasound |
|---|---|---|---|---|
| Cost Effective | ✓ | | ✓ | ✓ |
| >20m Range | ✓ | ✓ | ✓ | |
| Single path (no multipath) | ✓ | ✓ | | |
| Resolution | ✓ | ✓ | | |
| Compact | ✓ | | | ✓ |
| All Weather | ✓ | | ✓ | ✓ |
| Low Power | ✓ | | ✓ | ✓ |

FIG. 6

MARINE VESSEL LIDAR SYSTEM

RELATED APPLICATIONS

The current U.S. non-provisional patent application claims priority benefit with regard to all common subject matter of an earlier-filed U.S. provisional patent application titled "MARINE VESSEL LIDAR SYSTEM", Application Ser. No. 62/773,780, filed Nov. 30, 2018. The earlier-filed application is hereby incorporated by reference into the current application in its entirety.

BACKGROUND

There are numerous challenges associated with navigating a marine vessel. Autodocking and other navigation assist systems have been developed to aid users in accurately positioning their vessels. Typically users visually, either manually or with optical cameras, gauge distances to nearby objects to navigate through crowded marines and to dock.

SUMMARY

Techniques are disclosed to enable an electronic system for use in connection with navigating a marine vessel to a desired position with respect to a waterline boundary. The system has one or potentially more light detection ranging (LIDAR) sensors for detecting structures across a region by vertically scanning the region using the LIDAR sensors. The system also includes a memory element configured to store characteristics of the detected structure. Additionally, the system includes a processing element that can identify a primary reference point associated with navigation of the marine vessel to the desired position based on the characteristics of the detected structure and display information about a current position of the marine vessel in relation to the desired position.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWINGS

The figures described below depict various embodiments of the present invention. It is understood that these figures depict exemplary embodiments. The exemplary features illustrated in the figures are intended to represent these aspects of the various disclosed embodiments and not intended to limit the claimed scope to any particular feature. Further, whenever possible, the following description refers to the reference numerals included in the figures, in which features depicted in multiple figures are designated with consistent reference numerals.

FIG. 6 is a chart breaking down the advantages of a LIDAR system when compared to alternative technologies;

DETAILED DESCRIPTION

Figure 1:
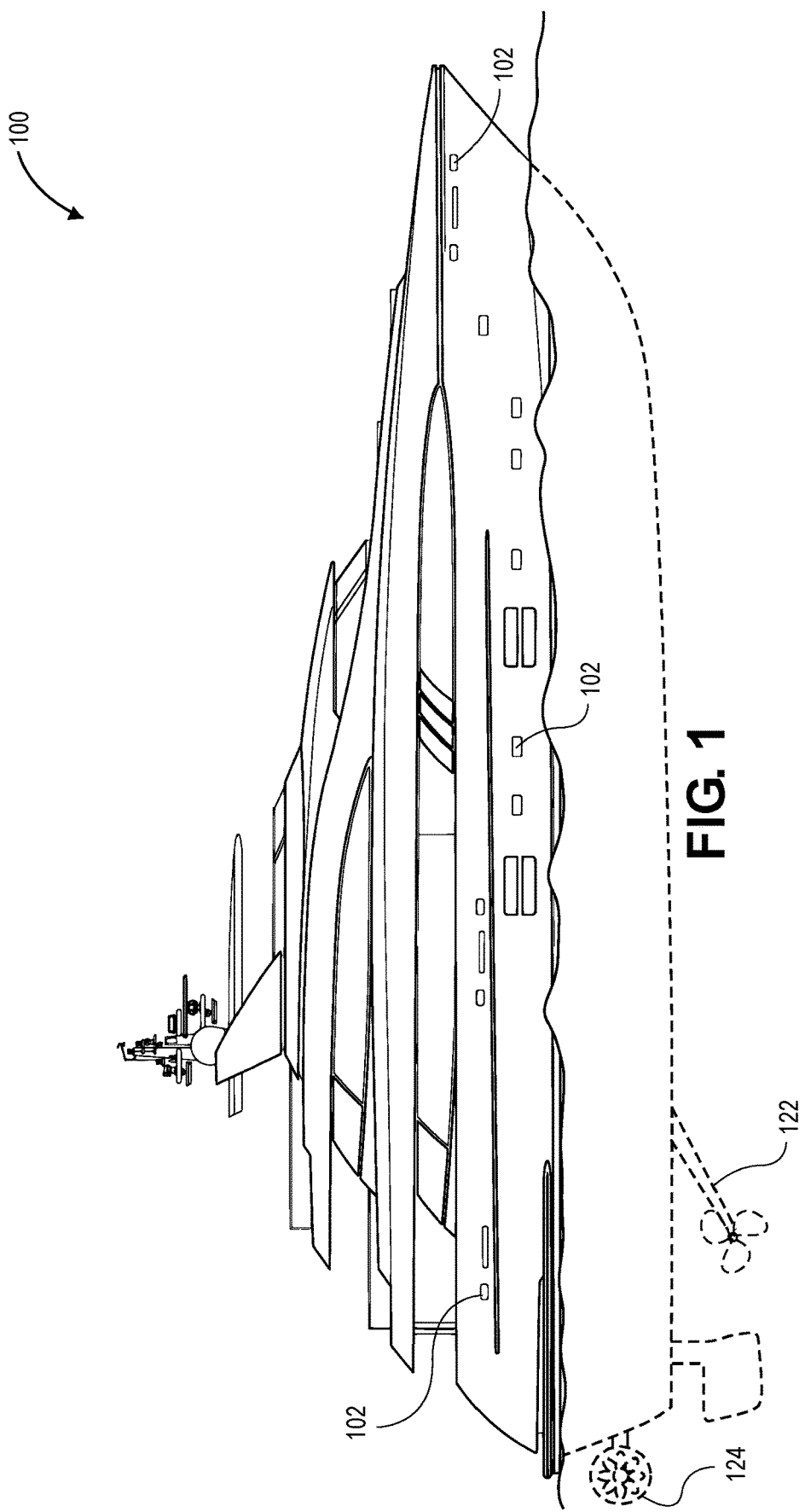
FIG. 1 is a side elevation view of a marine vessel that is provided with navigation capabilities consistent with example embodiments of the present application.

The following text sets forth a detailed description of numerous different embodiments. However, it is understood that the detailed description is to be construed as exemplary only and does not describe every possible embodiment since describing every possible embodiment would be impractical. In light of the teachings and disclosures herein, numerous alternative embodiments may be implemented.

It is understood that, unless a term is expressly defined in this patent application using the sentence "As used herein, the term "_____" is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent application.

The following detailed description of the technology references the accompanying drawings that illustrate specific embodiments in which the technology may be practiced. The embodiments are intended to describe aspects of the technology in sufficient detail to enable those skilled in the art to practice the technology. Other embodiments may be utilized and changes may be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology may include a variety of combinations and/or integrations of the embodiments described herein.

Embodiments of the technology apply to the field of marine vessel navigation systems using LIDAR sensors. Using LIDAR sensors that utilize a near infrared spectrum that is undetectable to the human eye can enable a navigation system in a marine environment to identify docks, boats, and shorelines by differentiating objects from the water as water typically has a detectable LIDAR signature.

Navigation assist systems consistent with the present teachings are beneficial at least in the following use cases: bow mount collision avoidance, trailer mast detection, slip entry, and fast approach alert. Moreover, navigation systems consistent with the present teachings can provide bow mount prop strike detection by scanning the water surface for floating logs, rock piles, buoys, and the like. In various embodiments, an alternative LIDAR sensor with a different wavelength can be used that is capable of penetrating the water surface. In this embodiment, only objects near the surface of the water would be detectable but this is still useful, for example, in the case of detecting swimmers in the vicinity of the propeller. If a swimmer is detected, the engine can be automatically shut down. In various embodiments, the LIDAR sensors are mounted on gunwale sides to aid in docking, automatic and operator assisted. In various embodiments, the LIDAR sensors can be mounted on trolling motor heads, for example, to maintain a position by the marine vessel at a predetermined distance from a dock, shoreline, or other object.

In various embodiments, the navigation system of the present teachings can provide an intuitive fishing experience when used with trolling motors to follow shoreline without using GPS positioning or a depth contour of the shoreline. In this way, the LIDAR sensors can maintain a position from various objects or structures in the reference region within the field of view of the LIDAR sensors. Similarly, the disclosed navigation system can be used as a backup sensor for a marine vessel where the LIDAR sensors include sensors mounted on or near the stern of the marine vessel to facilitate backing into a slip. In various embodiments, this can serve as an accessory/redundancy to camera-based docking system. Additionally, the disclosed navigation system can operate as a collision alert pop-up with a tap-to-access detailed view. A pop-up bug icon is provided at the portion of the screen related to the object or obstruction that is in the way of navigation. The pop-up may provide an indication regarding the location of the obstruction, for example bow-middle front, stern port-lower left, etc.

In various embodiments, when performing an autodocking operation the disclosed navigation systems may perform secondary reference scanning. LIDAR can run into accuracy and precision issues at short distances, typically less than one meter. To overcome this issue, the disclosed navigation systems can establish a secondary reference point to track once the primary point of interest becomes too inconsistent to track at close ranges. For example, this secondary reference could be the far edge of the dock, another boat in the adjoining slip, or a deck box.

In various embodiments, initially, the disclosed navigation systems begin with long-range tracking without the use of a secondary reference point. Next the disclosed navigation systems have identified the edge of a dock (or other reference destination) with a relatively high degree of confidence using disclosed methods of dock edge detection. The dock edge serves as a reference point for identifying a secondary reference point when a consistent secondary reference becomes available as the boat moves towards to the dock. As the boat approaches, LIDAR data will become less variant between scans. At a threshold of variability, a secondary reference is employed as set forth below with respect to medium range detection.

At medium range, when the variance threshold from the phase above has been met, the disclosed navigation systems begin searching for a secondary reference point. A secondary reference point is established by tracking a distinct point that shows a consistent positive linear correlation to the primary reference point. This provides a degree of certainty that the secondary reference point is a fixed object on the dock, and not noise, water, or another independently-moving object. Because this point is not moving relative to the edge of the dock (and is therefore unlikely to move going forward), the distance to this secondary reference point can be considered after factoring in the distance between the primary and secondary reference points.

While a single secondary reference point may be used for the docking process, points with similar correlation values may be tracked as alternatives in case the secondary reference point becomes unstable. During this phase, the system will continually evaluate the distance between the primary and secondary reference points. At the moment where the primary reference point is considered to be too close or unreliable, the distance between the primary and secondary reference points is recorded and used as a constant offset, as follows: Offset=Dsecondary−Dprimary. This offset is be subtracted from secondary reference point readings to serve as an analog of primary readings at close range: Dprimary*=Dsecondary−Offset. In various embodiments, the primary reference point is considered to be unreliable if differences in subsequent measurements of the primary reference point exceed 20% of the distance to the object being navigated to, i.e. the dock edge, for example.

In various embodiments, for short-range tracking and secondary reference utilization, when the primary reference point would be too close to be considered accurate or trackable, the secondary reference point is used exclusively to track the distance to the dock.

Because a LIDAR sensor requires a nonzero amount of time in which to collect samples and integrate them into a distance measurement, an exponential backoff LIDAR scanning technique can be used in various embodiments. Ideally, LIDAR measurements would remain perfectly stable and consistent during the sampling process to ensure that the result reflects a single point in space. However, in a real-world application, the momentum and mechanical realities results in calculations that are not perfectly consistent. A scanning LIDAR application must keep the LIDAR in motion a majority of the time to provide a high refresh rate, reduce wear on motor mechanics, and remove the need for high precision mechanical device, which would increase cost. Accordingly, these principles can be matched by varying the speed of the scan to balance the resolution, consistency, and refresh rate of the LIDAR sensor. Moreover, the further away a LIDAR scanner is from the object being observed, the lower the resolution. i.e. as the LIDAR sensor moves away from the target at a constant LIDAR sample rate, the same number of data points is used to describe a larger circumference circle. This decreases the overall resolution of the scan, as each point is expected to describe an increasing part of the arc length, leading to details being potentially overlooked or summarized incorrectly.

FIG. 1 is a side elevation view of a marine vessel that is provided with navigation capabilities consistent with the present teachings. Configurations may be employed in the following marine vessel environment with the exemplary associated technology and configurations. However, the LIDAR systems of the present invention may be employed in any environment or any configuration. A marine vessel (e.g., a boat) employs one or more motors to navigate the marine vessel through the water. For example, the marine vessel includes a primary motor (e.g., a propulsion motor) that propels the marine vessel through the water. In embodiments, the marine vessel further includes at least one secondary motor (e.g., a trolling motor and/or thruster) that can be used instead of or in addition to the propulsion motor. For example, a trolling motor may be used instead of the propulsion motor when navigating the marine vessel through environments that require precision (e.g., navigating around obstacles and/or in shallow water). Another example is where a trolling motor can be used to steer the marine vessel while the propulsion motor actuates the marine vessel in a forward or backward direction. Similarly, a thruster can be used in addition to or instead of the propulsion motor and/or thruster to actuate the marine vessel or a portion thereof (e.g., the bow or stern) in a first or second direction (e.g., to the right or left).

A trolling motor (or possibly the propulsion motor) may be used to control (e.g., maintain or navigate towards) a position of the marine vessel. For example, the trolling motor can actuate the marine vessel in a manner that maintains the trolling motor at a fixed (or substantially fixed) position in the water. However, while doing so, the trolling motor is unable to maintain the orientation of the marine vessel in a fixed (or substantially fixed) orientation because the marine vessel can pivot around the trolling motor. The same is true with regard to any reference point of the marine vessel (e.g., a reference point based on a position of another motor, a center of the marine vessel, etc.). It can be advantageous to control the position and orientation of the marine vessel, for example, the keep the marine vessel at a position without it turning or rotating. For example, controlling the position and orientation of a fishing boat can help to avoid tangled lines or situations in which an individual is required to move to another position on the fishing boat in order to cast his/her line. Moreover, a larger marine vessel at sea may wish to maintain a consistent distance from shoals or the shore or to stay in a constant position despite wind and currents for viewing the shore or being boarded by or launching a dinghy, for example.

As shown in FIG. 1, the marine vessel 100 has at least one propulsion motor 122 that is the primary source of propulsion for navigating the marine vessel 100 through the water. In an embodiment, the propulsion motor 122 can be mounted beneath a rear portion, e.g., beneath the stern of the marine vessel 100. In the embodiment shown in FIG. 1, the marine vessel 100 is also shown to include a side thruster 124. For example, the side thruster 124 may be mounted to a stern portion of the marine vessel 100. The side thruster 124 can be operable in parallel with (e.g., as the same time as) the propulsion motor 122 to enhance steering capabilities of the marine vessel 100. In other situations, the side thruster 124 may be operable instead of the propulsion motor 122 to navigate the marine vessel 100 at slower speeds and/or with greater precision (e.g., when navigating around obstacles, pulling into or out of a berth, or the like).

Figure 2:
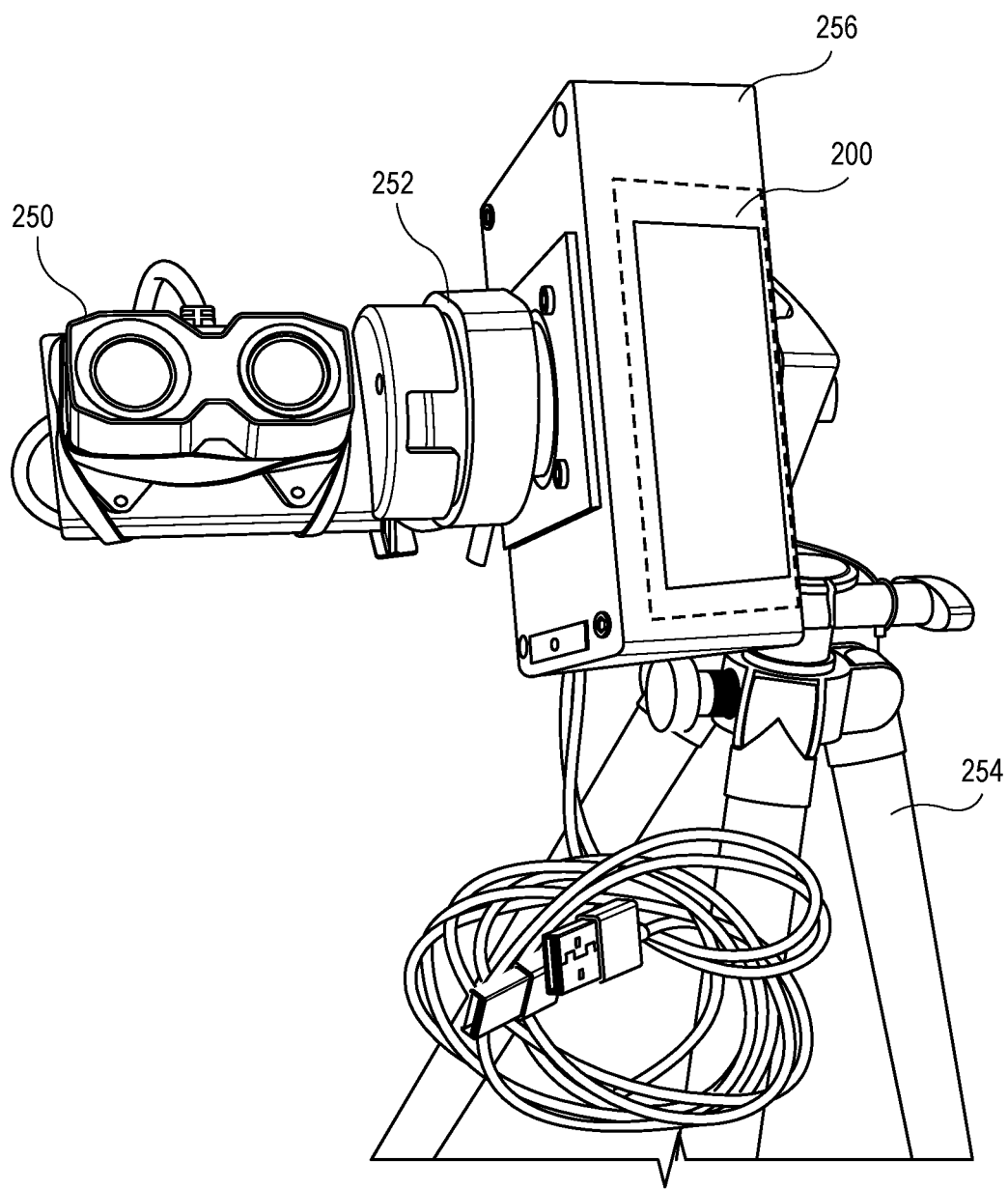
FIG. 2 is a schematic depiction of a LIDAR sensor.

FIG. 2 is a schematic depiction of a LIDAR sensing system consistent with the present teachings. In various embodiments, LIDAR sensor 250 is a high-performance optical distance measurement sensor such as the Garmin® LIDAR-Lite sensor. In various embodiments, motor 252 is provided to tilt the LIDAR sensor 250 up and down to vertically scan a region within a field of view associated with the LIDAR sensor 250. In various embodiments, a control system 200 is contained within a control system enclosure 256. In an embodiment the combination of the LIDAR sensor 250, the motor 252, and the enclosure 256 including the control system 200 are mounted on a platform 254 such as the one illustrated in FIG. 2, which is a tripod for testing and potentially calibrating the system. It is understood that in typical operational environments on a marine vessel such as the marine vessel 100 of FIG. 1, the LIDAR sensor combination would be provided in any suitable waterproof enclosure mounted to the marine vessel 100.

In various embodiments, as an alternative to a 2D LIDAR sensing system, a 3D LIDAR sensing system may be employed, which selects a region to scan utilizing a MEMS array. In this embodiment, energy is transmitted thereby at least partially illuminating a region with a particular wavelength of energy and selecting a region to analyze by steering the MEMS array. In an embodiment, a DLP apparatus is deployed and the MEMS array of the DLP is used to direct the received energy to an associated detector or array of detectors. Just as the motor 252 of FIG. 2 is used to rotate the LIDAR sensor 250 up and down to create a 2D representation of objects in the field of view, in this embodiment a similar rotational device is used to rotate the LIDAR energy transmitter (e.g. an LED) and MEMS array to produce a 3D representation of objects in the field of view.

Figure 3:
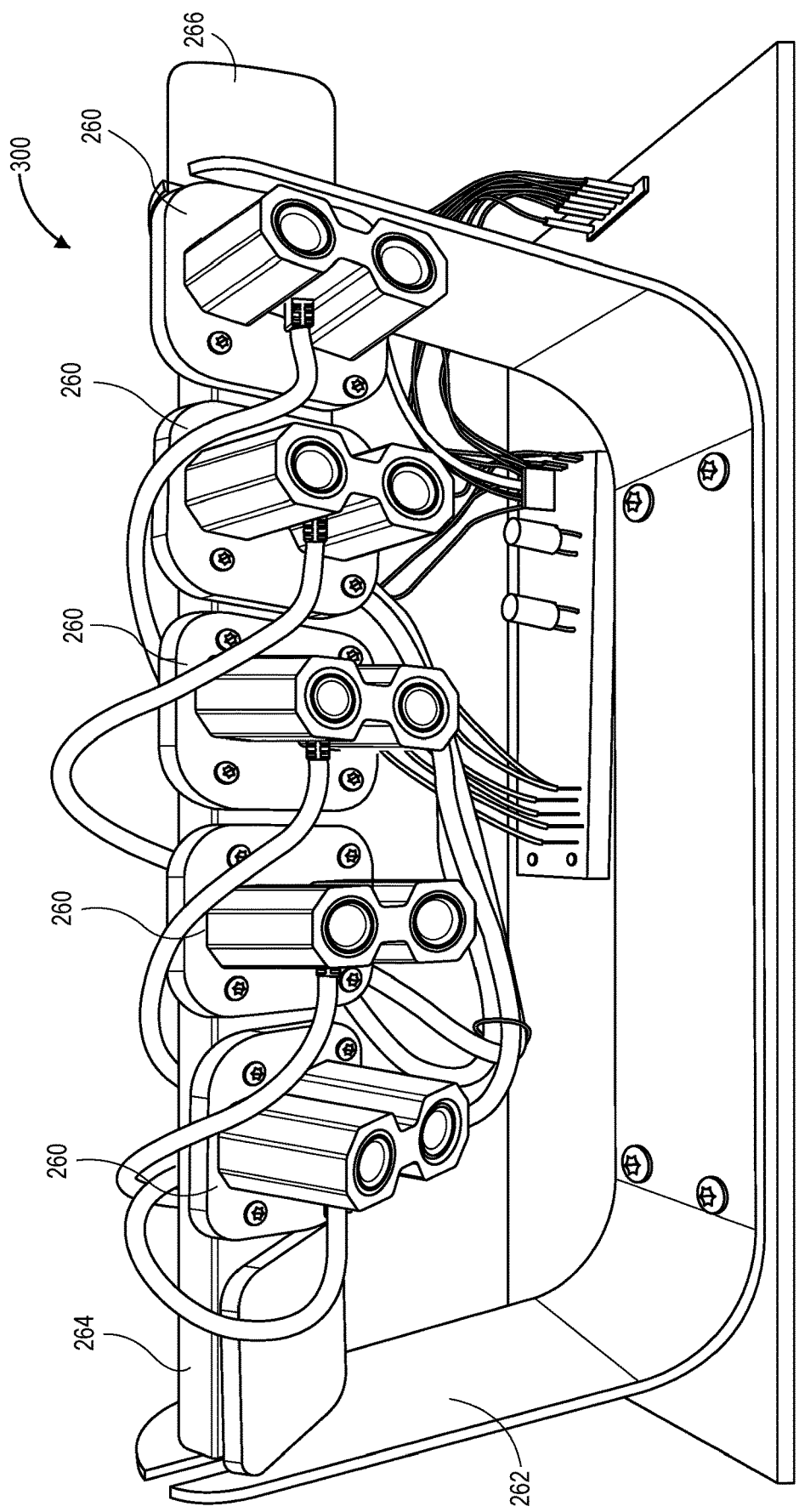
FIG. 3 is a schematic depiction of an array of LIDAR sensors.

FIG. 3 is a schematic depiction of an array of LIDAR sensors consistent with the present teachings. In various embodiments, as an alternative to the single LIDAR sensor 250 shown in FIG. 2, LIDAR sensors 260 (forming a LIDAR array 300) are mounted to a common rotational platform 264, which can be tilted up and down to scan a region within a desired field of view. In various embodiments, a rotational motor 266 is employed to rotate the common rotational platform 264 to allow the LIDAR sensors 260 to scan vertically to detect distances and characteristics of objects within the field of view of the LIDAR sensors 260. The LIDAR array 300 is supported by a support member 262 which can be mounted to any surface such as a surface of the marine vessel 100. As noted above, this will typically be contained within any suitable waterproof enclosure for use in connection with a marine vessel.

Figure 4A:
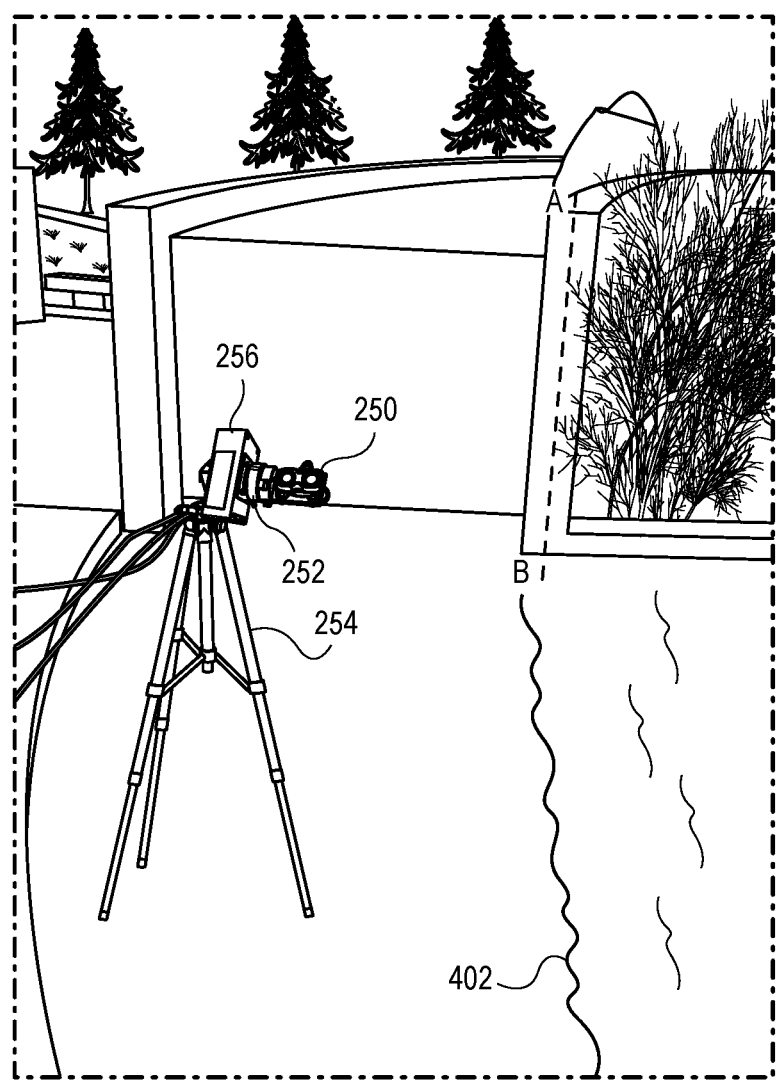
FIG. 4A is a test environment using a LIDAR sensing system combination for demonstrating characteristics of a LIDAR sensor.

FIG. 4A is a test environment using a LIDAR sensing system for demonstrating characteristics of a LIDAR sensor consistent with the present teachings. In various embodiments, the LIDAR sensor 250 is used to vertically scan the various physical characteristics within a region within the field of view of the LIDAR sensor 250. As set forth in connection with FIG. 1, the motor 252 rotates the LIDAR sensor 250 up and down to perform a vertical scan of a particular region, such as region A-B in FIG. 4A as further described below in connection with FIG. 4B.

Figure 4B:
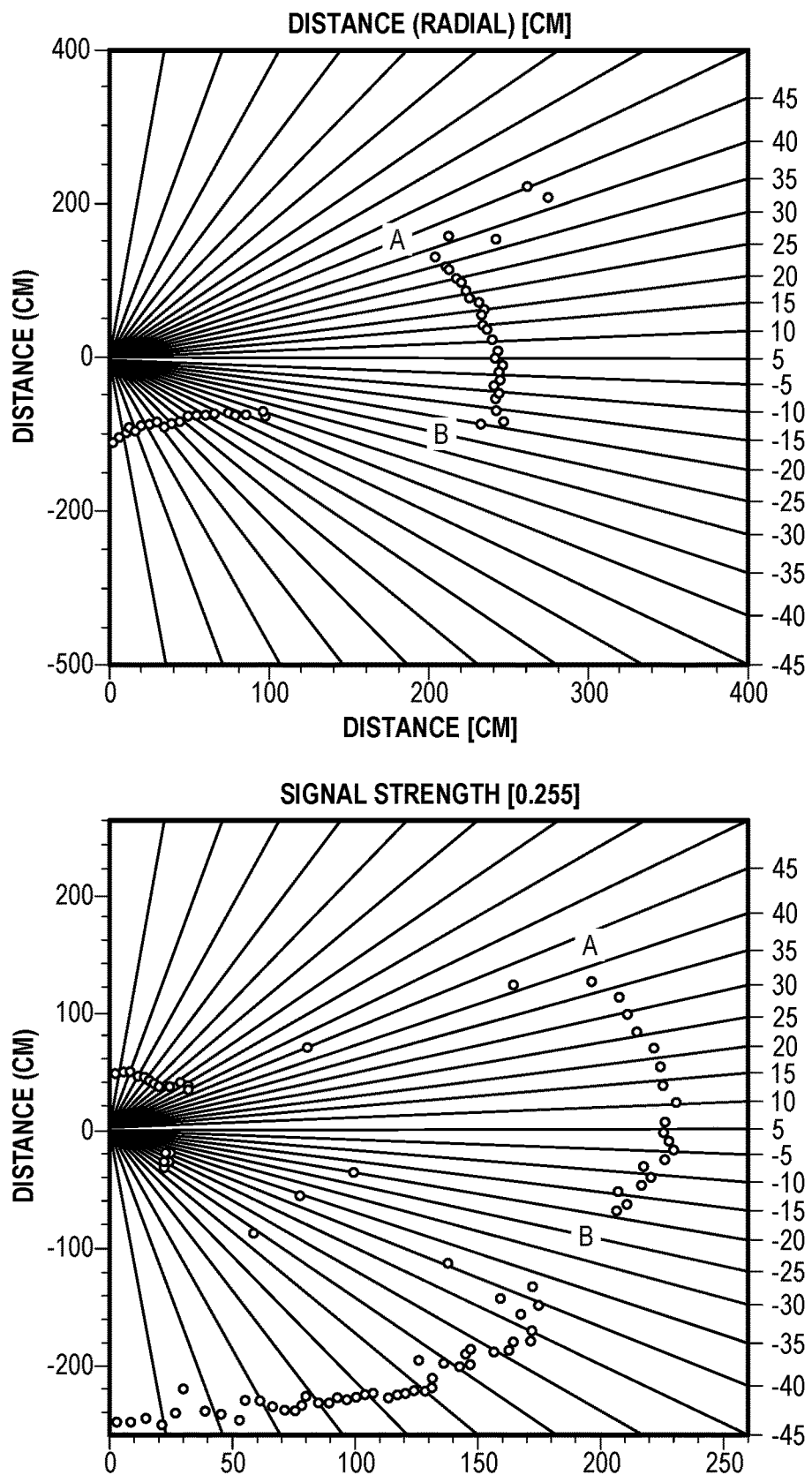
FIG. 4B contains graphs of measurements made with a LIDAR sensor.

FIG. 4B contains graphs of measurements made with a LIDAR sensor consistent with the present teachings. The top graph in FIG. 4B represents the measured distance from the LIDAR sensor 250 to objects in a particular region within the field of view of the LIDAR sensor 250. As the LIDAR sensor 250 is rotated upwards towards the horizon, past approximately +40 degrees, the distance to a next object is undetectable meaning the LIDAR sensor 250 is not receiving a return signal. By contrast, below approximately +40 degrees, the line A-B is detected at approximately 200 to 225 cm in distance from the LIDAR sensor 250. Similarly, as illustrated in FIG. 4B, signal return strength is relatively constant along the measured line of A-B, whereas it approaches zero above about +40 degrees of rotation. In the negative direction, the signal strength is strongest when the LIDAR sensor 250 is pointed at the ground beneath the sensor, i.e. −40 degrees and lower. Moreover the low signal strength area in the negative direction (see between −5 and −15) can be correlated to water or another non-reflective surface.

Figure 5:
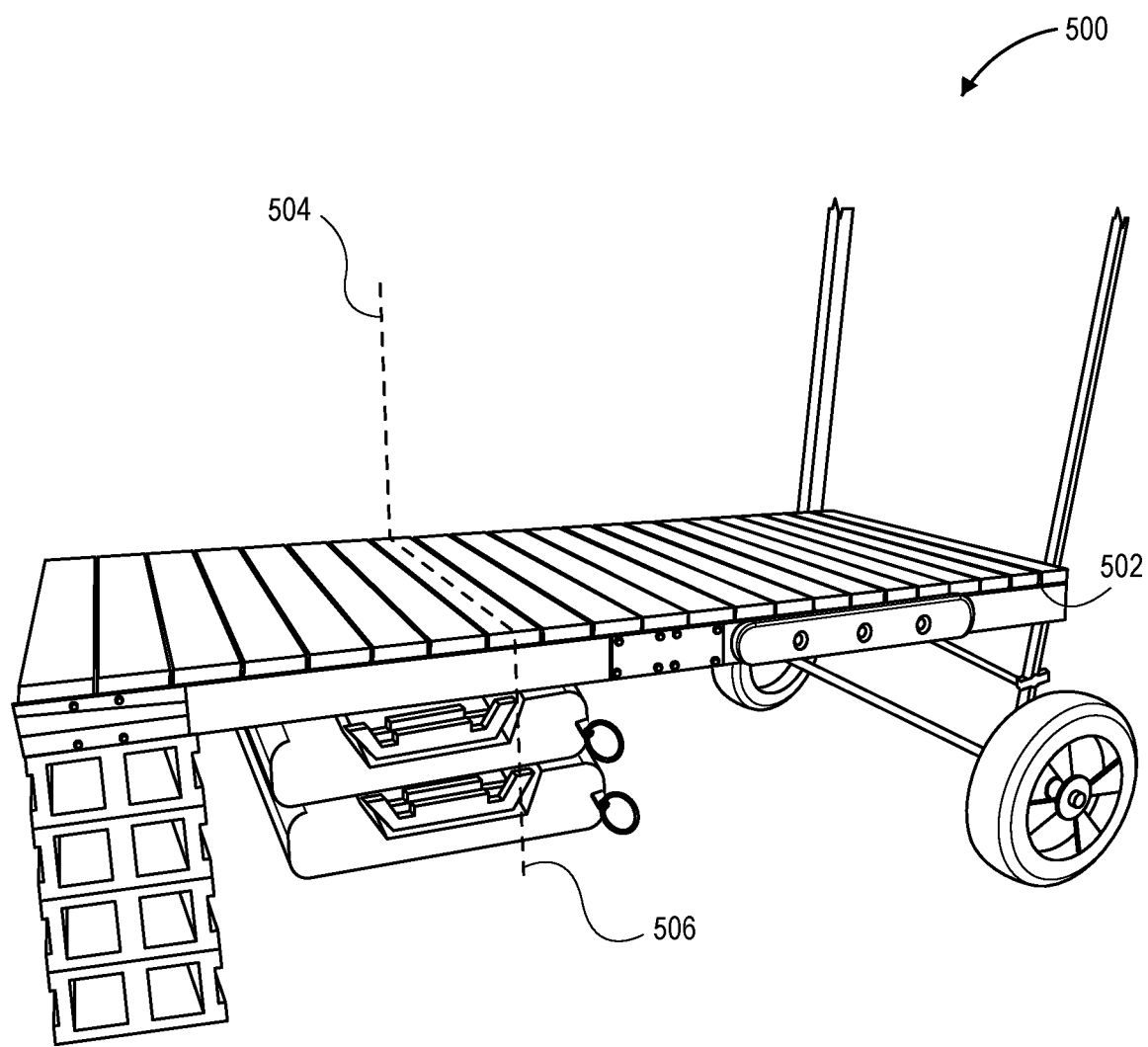
FIG. 5 is a simulated view of the edge of a dock.

FIG. 5 is a view of a simulated dock 500, which dock edge 502 can be detected in a way similar to one at which a marine vessel would need to perform autodocking. In various embodiments, the marine vessel 100 will need to pull up to the side of a dock which would be somewhat elevated above the waterline in a marina. When observed with a LIDAR sensor, a dock edge or shoreline manifests itself as a waterline boundary. As used herein "waterline boundary" means the interface between water and another physical object, where the water meets or makes contact to an object of interest. Water absorbs or scatters majority a of the light emitted by the LIDAR. Occasionally water will provide a strong return due to a ripple, but returns from scanning water are typically intermittent and inconsistent. The consistently strong returns at the LIDAR sensor can be used to identify objects such as docks or a shoreline. A challenge is to identify the signal window or region within the sensor's field of view that includes the dock edge and correctly identify this edge as the object that is in fact the nearest item of interest for the autodocking system, for example. The signal strength obtained from the LIDAR sensor can be used to identify the object which is sought to be identified, i.e the waterline boundary or the edge of the dock at vertically scanned line 506. Items behind the back of the dock will be detected by the distance determination of the LIDAR sensor at line 504.

FIG. 6 is a chart breaking down the advantages of a LIDAR system when compared to alternative comparable technologies. As shown, camera systems, such as stereo camera systems can perform at ranges of over 20 meters as well as within a single path. Moreover, cameras have suitable resolution, but they are not as cost effective as the LIDAR solutions of the present teachings, nor are they as compact, all-weather, and low-power as the LIDAR solutions of the present teachings. RADAR and ultrasound are cost effective, but ultrasound lacks sufficient distance capabilities and neither of them have adequate single path capabilities or adequate resolution. While ultrasound is sufficiently compact, RADAR is not.

Figure 7:
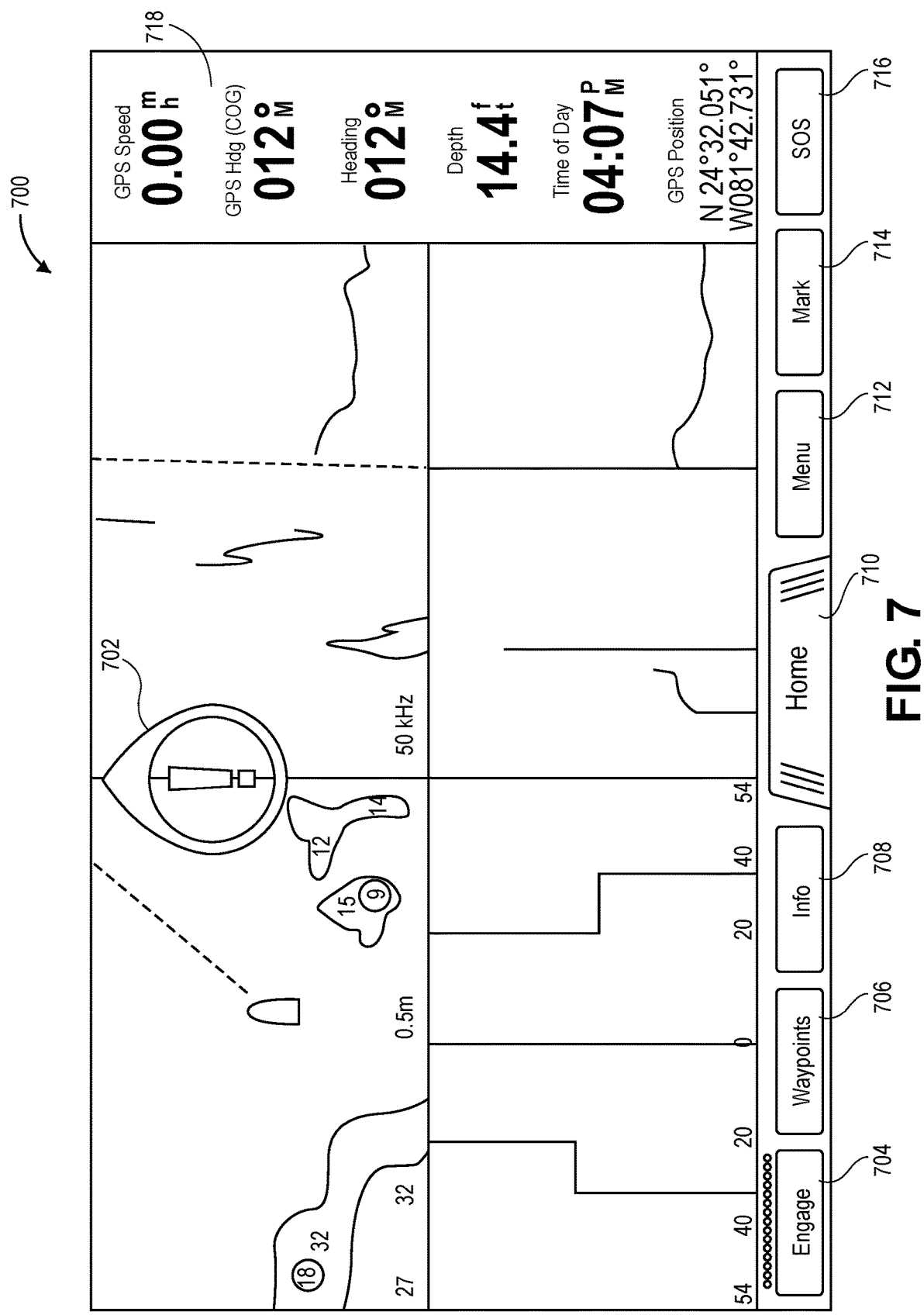
FIG. 7 is a collision alert pop-up warning view of a display used in connection with an example marine vessel navigation system.

FIG. 7 is a collision alert pop-up warning view of a display 700 used in connection with a marine vessel navigation system consistent with the present teachings. In various embodiments navigation systems employ a display that can provide a warning symbol 702 when, for example, the marine vessel is about to collide with an obstruction. In coastal navigation, in channels or even open water, a marine vessel may encounter lobster traps, crab traps or the like. It is understood that such collisions can damage the marine vessel if its hull or propulsion system collides with the traps or the associated buoys or lines connecting the buoys to the traps. By using LIDAR sensors or sensor arrays as described in connection with the present teachings, information about objects and obstructions at or below the water surface such as the buoys associated with lobster or crab traps can be provided to the navigation system and thereby collision warnings provided to the operator of the marine vessel. In various embodiments, the vessel can even be diverted from colliding with the obstruction if auto-navigation is enabled, by for example disengaging propulsion and thereby slowing down so the operator can take control and steer around the obstruction.

In alternative embodiments, the identified object that is sought to be avoided may be another marine vessel, a swimmer, a marine animal, or other natural obstruction in the coastal area being navigated. In various embodiments, other functions are provided in connection with the display 700 such as the engage button 704, the waypoints button 706, the info button 708, the home button 710, the menu button 712, the mark button 714, and the SOS button 716. In various embodiments, sidebar 718 contains display parameters such as GPS speed and heading as well as calculated heading and water depth. In various embodiments, the sidebar 718 of the display 700 also displays the current time of day and latitude and longitude coordinates corresponding to the current position of the marine vessel. It is understood that the buttons and display parameters provided in exemplary display 700 are meant for the purposes of illustration and are neither necessary nor exclusive in terms of the user experience that is provided with the display 700.

Figure 8A:
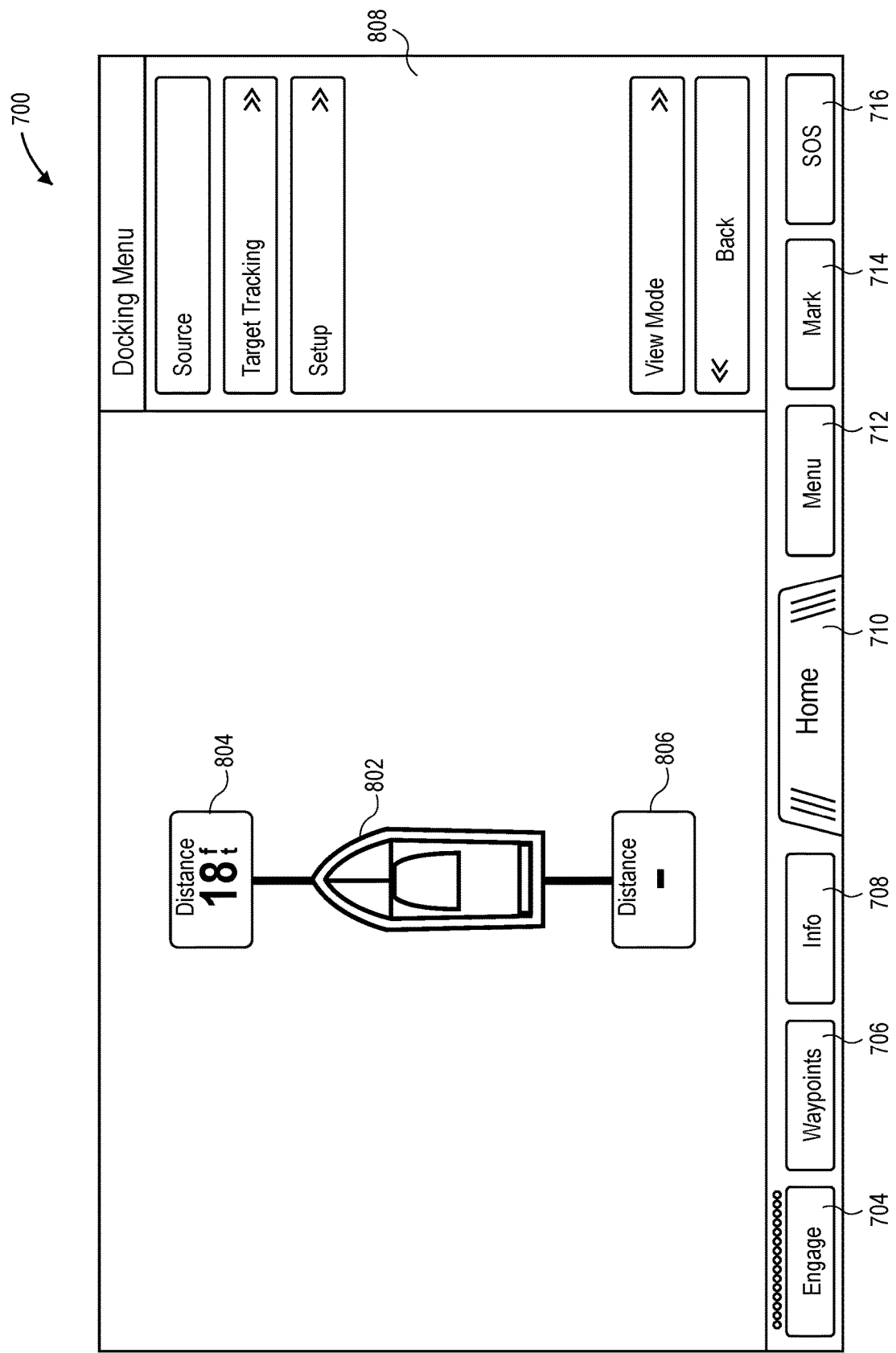
FIG. 8A is an alternative docking view of a display used in connection with an example marine vessel docking display.

FIG. 8A is an alternative docking view of a display used in connection with a marine vessel docking display consistent with the present teachings. In an embodiment, the display 700 is used to provide information regarding distance to a particular object such as, for example, a dock. In this embodiment, a forward distance icon 804 representing a forward distance of 18 feet is provided in the display 700 to the operator of the marine vessel so that the operator can approach the dock. Should an unexpected obstruction be detected, a collision warning pop-up as described in the previous figure. would be displayed to help the operator avoid an associated collision. In various embodiments, other distance icons, such as the rear distance icon 806 are provided to indicate a distance to another object. As shown in FIG. 8A, there is no object in range and therefore the rear distance icon merely indicates a dash ("-"). In various embodiments, a sidebar 808 is provided with buttons that can be used to manipulate the docking view display, such as source, target tracking, setup, view mode, and back.

Figure 8B:
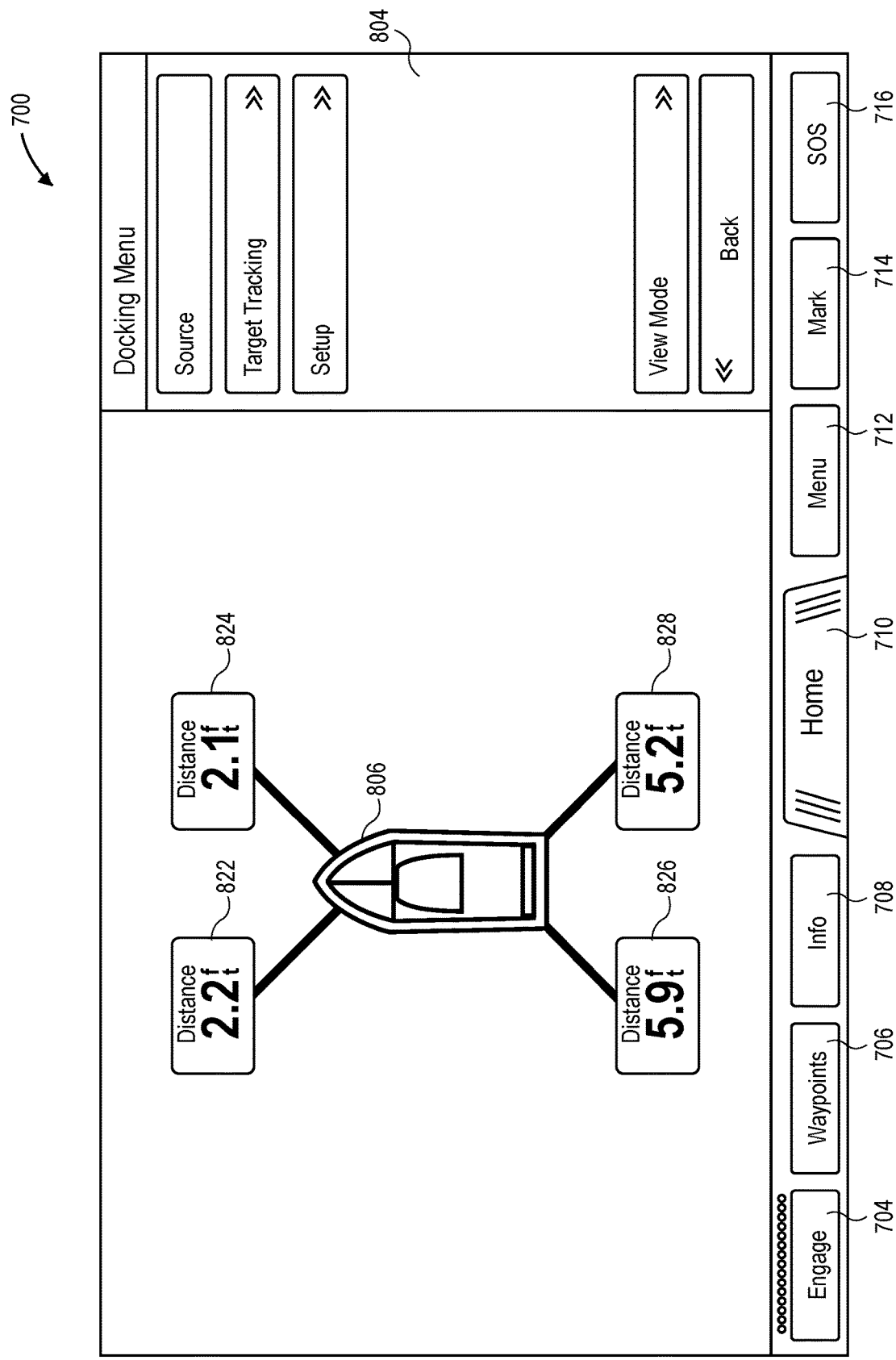
FIG. 8B is another alternative docking view of a display used in connection with an example marine vessel docking display.

FIG. 8B is another alternative docking view of a display used in connection with a marine vessel docking display consistent with the present teachings. Similarly to FIG. 8A, in various embodiments, the display 700 is used to provide information regarding distance to a number of objects such as, for example, a dock, other marine vessels and obstructions. Based on the capabilities of 360 degree coverage by having LIDAR sensors spaced around the perimeter of the marine vessel, objects can be detected in all directions. In this embodiment, a left-forward distance icon 822 representing a left-forward distance of 2.2 feet is provided in the display 700 to the operator of the marine vessel so that the operator can navigate. Should an unexpected obstruction be detected, a collision warning pop-up as described in the previous FIG. would be displayed to help the operator avoid an associated collision. Additionally a right-forward distance icon 824 representing a right-forward distance of 2.1 feet is provided as well as a left-rear distance icon 826 with a distance of 5.9 feet and a right-rear distance icon 828 showing a distance of 5.2 feet.

Figure 9A:
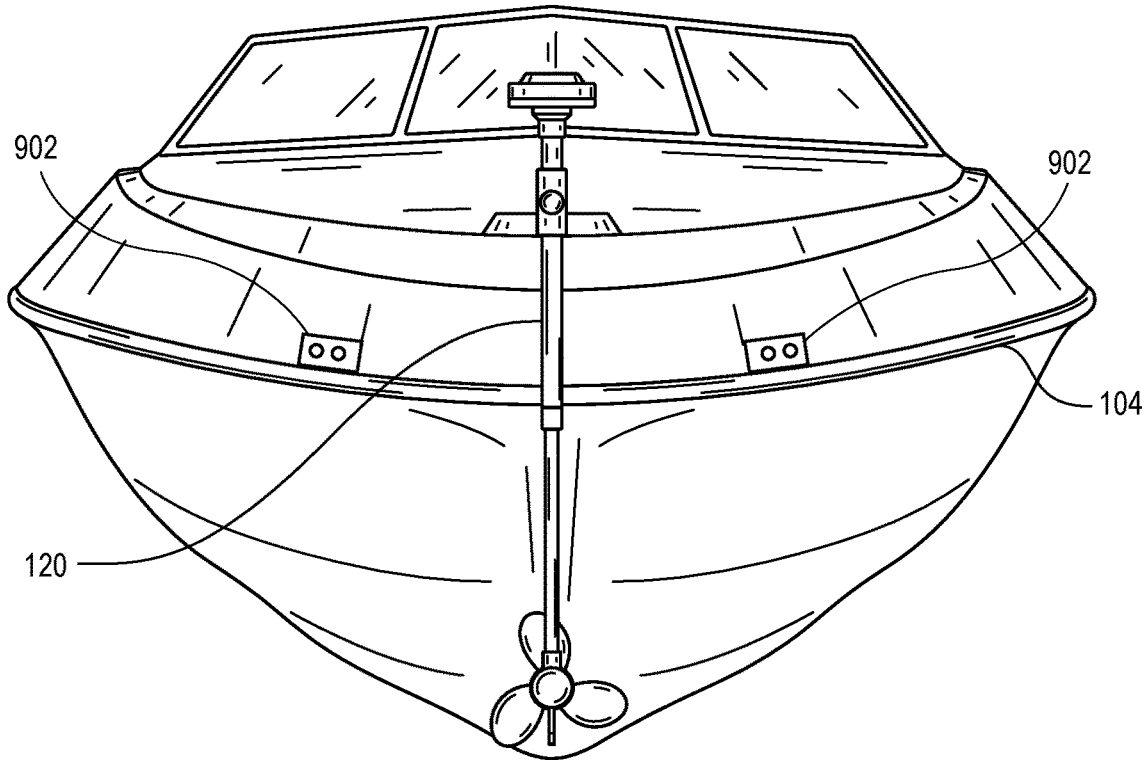
FIG. 9A is a front view of a marine vessel having a single trolling motor at the front of the marine vessel.

FIG. 9A is a front view of a marine vessel having a single trolling motor at the front of the marine vessel. For example, the trolling motor 120 may be mounted to a front portion (e.g., bow 104) of the marine vessel 100. The trolling motor 120 can be operable in parallel with (e.g., as the same time as) the propulsion motor 122 to enhance steering capabilities of the marine vessel 100. In other situations, the trolling motor 120 may be operable instead of the propulsion motor 122 to navigate the marine vessel 100 at slower speeds and/or with greater precision (e.g., when navigating around obstacles, in shallow water, or the like). In some situations, the trolling motor 120 may be employed to navigate the marine vessel 100 instead of the propulsion motor 122 in order to reduce turbulence resulting from the marine vessel 100 as it is navigated through the water. For example, reduced turbulence may be desirable to avoid scaring away fish or avoid damage to aquatic environments.

Figure 9B:
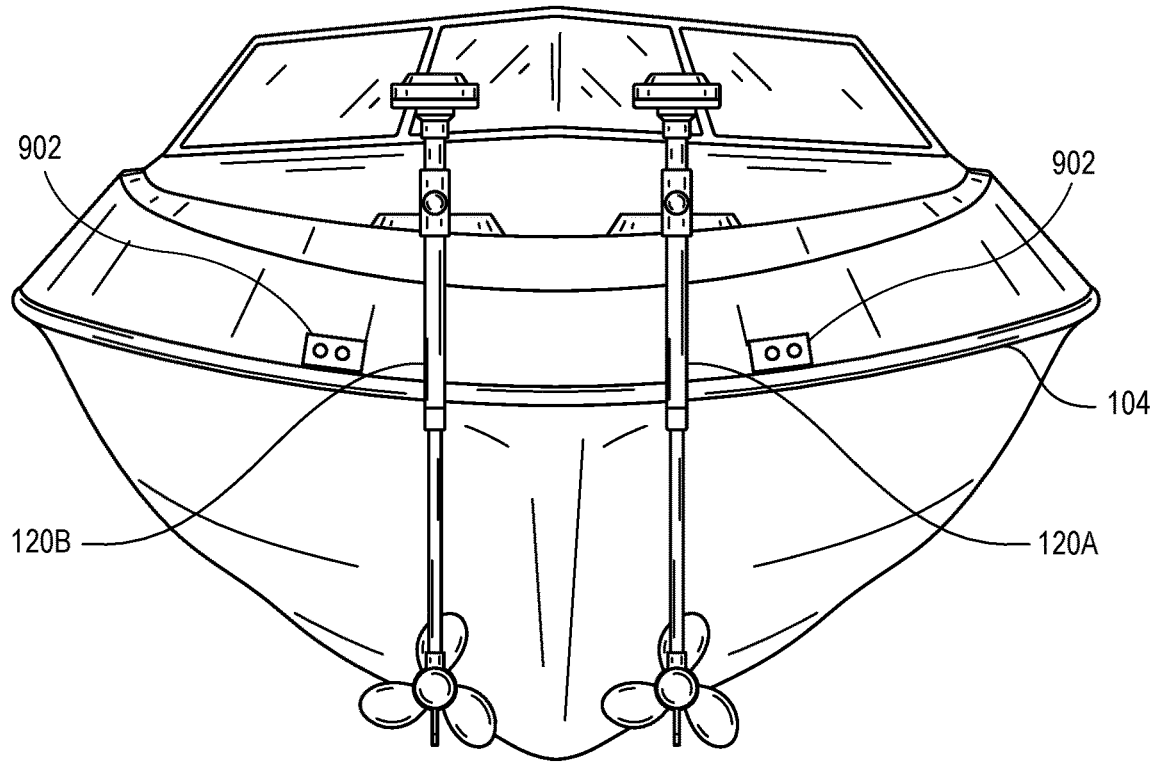
FIG. 9B is a is a front view of a marine vessel having two trolling motors at the front of the marine vessel.

While a single front-mounted trolling motor 120 is shown in FIG. 9A, the trolling motor 120 can be mounted to other portions of the marine vessel 120 (e.g., affixed to other portions of the marine vessel's hull 102). In an embodiment, the trolling motor 120 can be mounted to a rear portion (e.g., stern 110 and/or transom 112) of the marine vessel 100. For example, the trolling motor 120 can be mounted in proximity to (e.g., alongside) the propulsion motor 122 at the stern 110 and/or transom 112 of the marine vessel 100. In some embodiments, the marine vessel 100 can have a plurality of trolling motors 120 for additional power and/or enhanced steering capability. For example, in an embodiment shown in FIG. 9B, the marine vessel 100 has two trolling motors (e.g., motors 120A and 120B) mounted to a front portion (e.g., bow 104) of the marine vessel 100. In various embodiments, the marine vessel 100 can be controlled and navigated by means of LIDAR sensors such as LIDAR sensors 902 as shown in connection with FIGS. 9A and 9B.

Figure 10A:
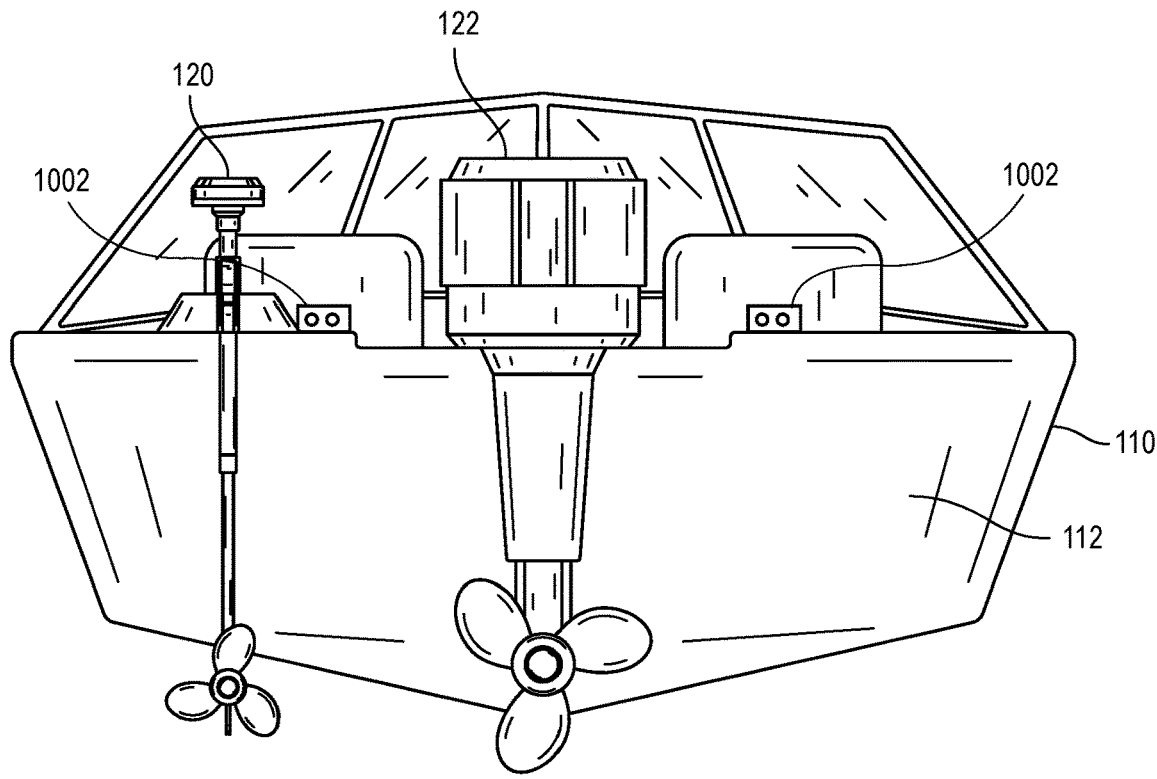
FIG. 10A is a rear view of a marine vessel having a single trolling motor on the transom of the marine vessel in addition to its outboard motor.
Figure 10B:
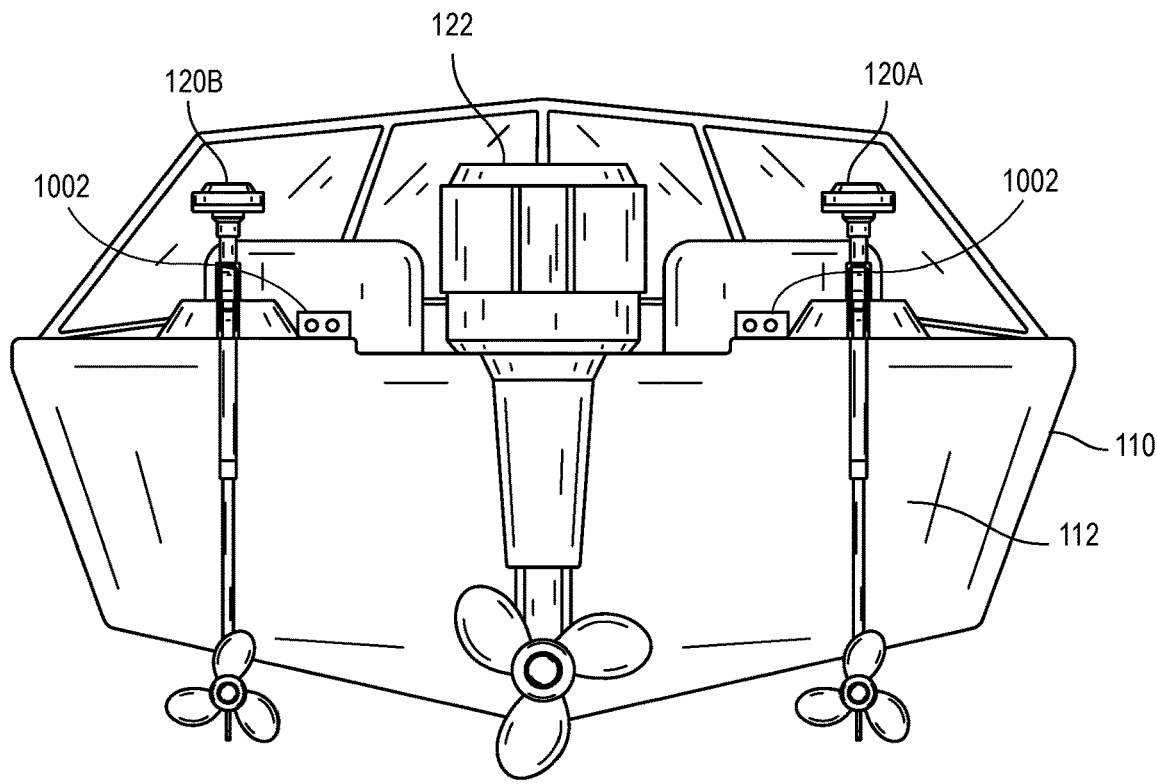
FIG. 10B is a rear view of a marine vessel having two trolling motors on the transom of the marine vessel in addition to its outboard motor.

In various embodiments, propulsion devices such as the trolling motor 120 can be mounted to other portions of the marine vessel 100 (e.g., affixed to other portions of the marine vessel's hull). In an embodiment, the trolling motor 120 can be mounted to a rear portion (e.g., stern 110 and/or transom 112) of the marine vessel 100 (e.g., as shown in FIG. 10A). For example, the trolling motor 120 can be mounted in proximity to (e.g., alongside) the propulsion motor 122 at the stern 110 and/or transom 112 of the marine vessel 100. In some embodiments, the marine vessel 100 can have a plurality of trolling motors 120 for additional power and/or enhanced steering capability. For example, in an embodiment shown in FIG. 10B, the marine vessel 100 has two trolling motors (e.g., motors 120A and 120B) mounted to a front portion (e.g., bow 104) of the marine vessel 100. In an embodiment shown in FIG. 10B, the marine vessel 100 has two trolling motors (e.g., motors 120A and 120B) mounted to a rear portion (e.g., stern 110 and/or transom 112) of the marine vessel 100. In other embodiments, the marine vessel 100 can have at least one front-mounted trolling motor 120 and at least one rear-mounted trolling motor 120. The foregoing embodiments are provided by way of example. The propulsion motor(s) 122 and trolling motor(s) 120 may be mounted in proximity to any location on the marine vessel 100 depending on the marine vessel 100 in which the motors are implemented. In various embodiments, LIDAR sensors 1002 are mounted on the transom 110 as illustrated in FIGS. 10A and 10B.

Figure 11A:
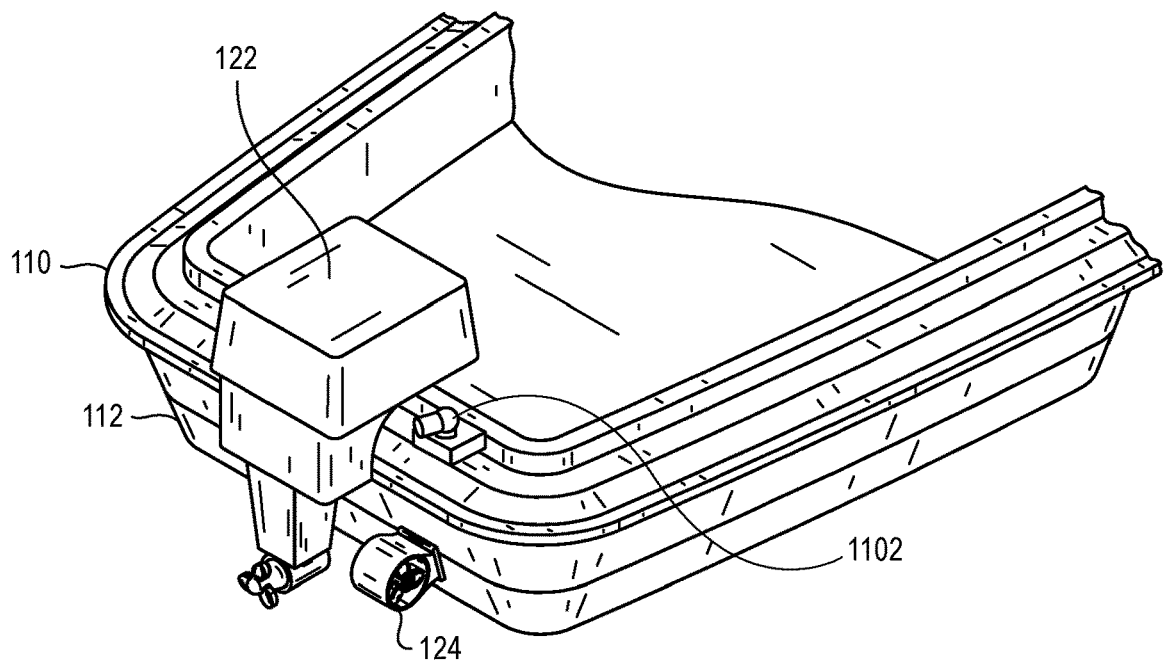
FIGS. 11A and 11B show embodiments of the marine vessel with at least one thruster mounted to the hull of the marine vessel.
Figure 11B:
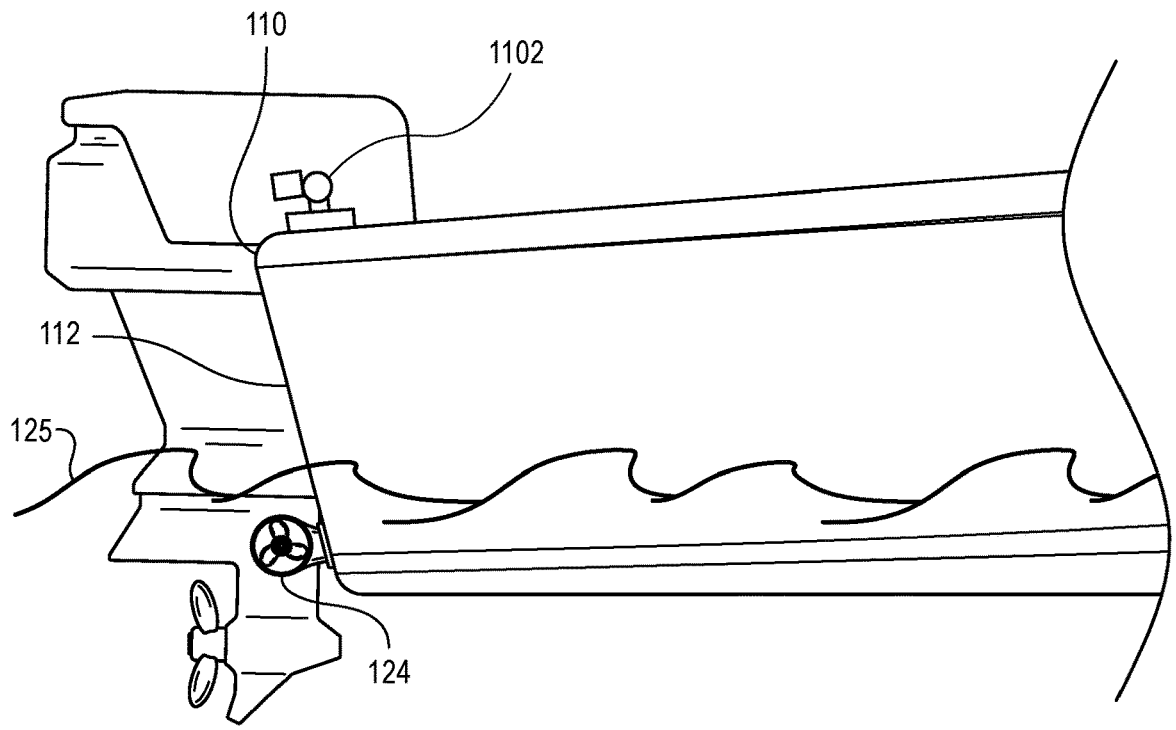

FIGS. 11A and 11B show embodiments of the marine vessel 100 with at least one thruster 124 mounted to the hull 102 of the marine vessel 100. For example, the thruster 124 may be mounted in proximity to a rear portion (e.g., at or near the transom 112) of the marine vessel 100. The thruster 124 can be mounted to a portion of the marine vessel 100 that is configured to be below the water's surface 125 when the marine vessel 100 is in the water. In embodiments, the thruster 124 is rigidly affixed to a portion of the hull 102 that is configured to be below the water's surface 125 (e.g., as shown in FIG. 11B). In embodiments, one or more thrusters 124 are configured to actuate the stern 110 of the marine vessel in a first direction (e.g., to the right) or a second direction (e.g., to the left) when the one or more thrusters 124 are active. In other embodiments, one or more thrusters 124 (e.g., one or more thrusters 124 mounted to a front portion of the marine vessel 100) are configured to actuate the bow 104 of the marine vessel in a first direction (e.g., to the right) or a second direction (e.g., to the left) when the one or more thrusters 124 are active. For example, at least one thruster 124 may be mounted in proximity to a front portion (e.g., bow 104) of the marine vessel 100 and/or in proximity to the starboard 108 or port 106. In some embodiments, at least one thruster 124 is mounted to a rear portion of the marine vessel 100 (e.g., as shown in FIGS. 11A and 11B) and at least one thruster is mounted to a front portion of the marine vessel 100 (e.g., at or near the bow 104). In such embodiments, the thrusters 124 are configured to selectively actuate the bow 104, the stern 110, or the marine vessel 100 in its entirety in a first direction (e.g., to the right) or a second direction (e.g., to the left) when some of the thrusters 124 (e.g., front or rear thrusters) or all of the thrusters 124 (e.g., front and rear) are active. The marine vessel 100 may employ one or more thrusters 124 for enhanced steering or control of the marine vessel 100 to help navigate through turbulent waters, for enhanced control when navigating the marine vessel 100 around obstacles, when parking the marine vessel 100, or in any other situation where it can be advantageous to actuate the marine vessel 100 or a portion (e.g., bow 104 or stern 110) of the marine vessel 100 in a generally left or right direction.

The marine vessel 100 can have any combination of propulsion motor(s) 122, trolling motor(s) 120, and thruster(s) 124 for navigating the marine vessel 100 through the water. For example, in an embodiment, the marine vessel 100 includes at least one propulsion motor 122 or at least one trolling motor 120 for navigating the marine vessel 100 through the water 100. In another embodiment, the marine vessel 100 includes at least one propulsion motor 122 and at least one trolling motor 120. In yet another embodiment, the marine vessel 100 includes at least one propulsion motor 122 and at least one thruster 124, or at least one trolling motor 120 and at least one thruster 124. Still in other embodiments, the marine vessel 100 includes at least one propulsion motor 122, at least one trolling motor 120, and at least one thruster 124.

Figure 12:
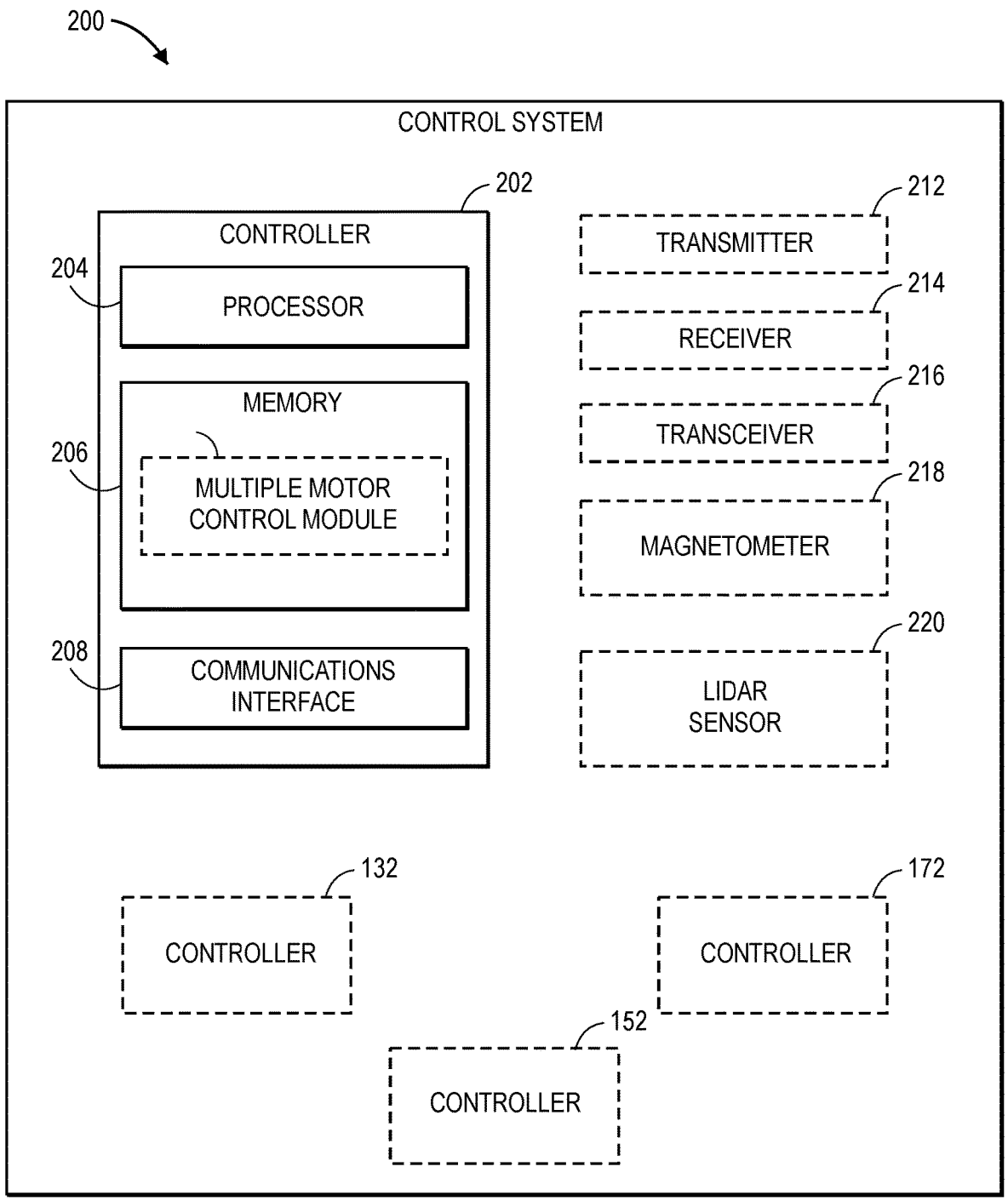
FIG. 12 is a block diagram of a control system that can be used in connection with vessel navigation systems.

FIG. 12 is a block diagram of a control system that can be used in connection with vessel navigation systems consistent with the present teachings. In various embodiments, the control system 200 is communicatively coupled to two or more marine vessel 100 motors (e.g., trolling motor(s) 120, propulsion motor(s) 122, and/or thruster(s) 124) via wired or wireless connections. In some embodiments, such as the embodiment shown in FIG. 12, the control system 200 is at least partially integrated within a navigation system as herein disclosed. For example, at least a portion of the control system 200 can be embedded within or attached to the associated marine vessel navigation system, in for example the display 700 (of FIGS. 7-8B) or an enclosure that is electrically coupled with the display 700. In some embodiments, the control system 200 can include controller 132, controller 152, and/or controller 172. For example, controller 132, controller 152, and/or controller 172 can be communicatively coupled to controller 202 or can replace controller 202 and perform some or all of the functions or operations described herein with regard to controller 202. In this regard, the control system 200 can be implemented as a distributed control system with controller 202, controller 132, controller 152, and/or controller 172 performing the functions or operations of the control system 200. For example, the one or more controllers can execute the multiple motor control module 210 (or modules) as one master controller, one master controller with one or more slave controllers, or as a distributed set of the controllers performing operations together, sequentially or at least partially in parallel. References herein to the control system 200 can include functions or operations performed by controller 202, controller 132, controller 152, and/or controller 172. In various embodiments, these controllers can control the operation of propulsion devices associated with the marine vessel as disclosed herein.

In various embodiments, the controller 202 can be communicatively coupled with some or all of the components of the control system 200. The controller 202 has a processor 204 included with or in the controller 202 to control the components and functions of the control system 200 described herein using software, firmware, hardware (e.g., fixed logic circuitry), or a combination thereof. The terms "controller," "functionality," "service," and "logic" as used herein generally represent software, firmware, hardware, or a combination of software, firmware, or hardware in conjunction with controlling the control system 200. In various embodiments, the controller 202 can include a processor 204, a memory 206, and a communications interface 208.

The processor 204 provides processing functionality for at least the controller 202 and can include any number of processors, micro-controllers, circuitry, field programmable gate array (FPGA) or other processing systems, and resident or external memory for storing data, executable code, and other information accessed or generated by the controller 202. The processor 204 can execute one or more software programs (e.g., multiple motor control module 210) embodied in a non-transitory computer readable medium (e.g., memory 206) that implement techniques described herein. The processor 204 is not limited by the materials from which it is formed or the processing mechanisms employed therein and, as such, can be implemented via semiconductor(s) and/or transistors (e.g., using electronic integrated circuit (IC) components), and so forth. The memory 206 can be a tangible, computer-readable storage medium that provides storage functionality to store various data and or program code associated with operation of the controller 202, such as software programs and/or code segments, or other data to instruct the processor 204, and possibly other components of the control system 200/controller 202, to perform the functionality described herein. The memory 206 can store data, such as a program of instructions (e.g., multiple motor control module 210) for operating the control system 200 (including its components), and so forth. It should be noted that while a single memory 206 is described, a wide variety of types and combinations of memory (e.g., tangible, non-transitory memory) can be employed. The memory 206 can be integral with the processor 204, can comprise stand-alone memory, or can be a combination of both. Some examples of the memory 206 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In embodiments, the control system 200 and/or the memory 206 can include removable integrated circuit card (ICC) memory, such as memory provided by a subscriber identity module (SIM) card, a universal subscriber identity module (USIM) card, a universal integrated circuit card (UICC), and so on.

The communications interface 208 can be operatively configured to communicate with components of the control system 200. For example, the communications interface 208 can be configured to transmit data for storage in the control system 200, retrieve data from storage in the control system 200, and so forth. The communications interface 208 can also be communicatively coupled with the processor 204 to facilitate data transfer between components of the control system 200 and the processor 204 (e.g., for communicating inputs to the processor 204 received from a device communicatively coupled with the controller 202, including, but not limited to, data received from the magnetometer 218, LIDAR sensing system 220, and/or any other component of the control system 200). It should be noted that while the communications interface 208 is described as a component of controller 202, one or more components of the communications interface 208 can be implemented as components of the control system 200 or components communicatively coupled to the control system 200 via a wired and/or wireless connection. For example, the control system 200 and/or the controller 202 can include a transmitter 212, a receiver 214, and/or a transceiver 216 for sending/receiving communications (e.g., control signals, position and/or orientation measurements, etc.) to/from the motors (e.g., trolling motor(s) 120, propulsion motor(s) 122, and/or thruster(s) 124). For example, the transmitter 212, receiver 214, and/or transceiver 216 can be directly coupled (e.g., wired) to one or more of the motors (e.g., trolling motor(s) 120, propulsion motor(s) 122, and/or thruster(s) 124) or configured to wirelessly communicate with one or more of the motors (e.g., trolling motor(s) 120, propulsion motor(s) 122, and/or thruster(s) 124).

The control system 200 can also include and/or can connect to one or more input/output (I/O) devices (e.g., via the communications interface 208), such as a display, a mouse, a touchpad, a touchscreen, a keyboard, a microphone (e.g., for voice commands) and so on. In embodiments, the control system 200/communications interface 208 includes at least one input device configured to receive user inputs. For example, the input device can include, but is not limited to, an electromechanical input device (e.g., a button, switch, toggle, trackball, or the like), a touch-sensitive input device (e.g., a touchpad, touch panel, trackpad, or the like), a pressure-sensitive input device (e.g., a force sensor or force-sensitive touchpad, touch panel, trackpad, button, switch, toggle, trackball, or the like), an audio input device (e.g., microphone), a camera (e.g., for detecting user gestures, or for face/object recognition), or a combination thereof.

In various embodiments, the control system 200 is configured to generate one or more control signals and/or configured to communication data (e.g., measurements, user inputs, etc.) to a trolling motor 120. The trolling motor 120 may also include or may be coupled with a controller 132, which may include components and/or circuitry as described above with regard to controller 202. The controller 132 can be configured to control a steering assembly 134 (e.g., electromechanical steering assembly) and/or an actuator 136

(e.g., motor) that drives the propeller 138 of the trolling motor 120. In embodiments, the controller 132 can be configured to turn, change the rotational direction of, and/or change the rotational speed of the propeller 138 by controlling the steering assembly 134 and/or actuator 136 based on control signals received from the control system 200. In some embodiments, the controller 132 itself is configured to generate the control signals or a portion thereof based on communication data (e.g., measurements, user inputs, etc.) received from the control system 200.

In some embodiments, the control system 200 is additionally or alternatively configured to generate one or more control signals and/or configured to communication data (e.g., measurements, user inputs, etc.) to a propulsion motor 122. The propulsion motor 122 may include or may be coupled with a receiver/transceiver 150 (or in some embodiments, a receiver and a transmitter) configured to receive the control signals and/or other communications from the control system 200. For example, the receiver/transceiver 150 can be communicatively coupled to the control system 200 via a wired or wireless connection. The propulsion motor 122 may also include or may be coupled with a controller 152, which may include components and/or circuitry as described above with regard to controller 202. The controller 152 can be configured to control a steering assembly (e.g., electromechanical steering assembly) and/or an actuator (e.g., motor) that drives the propeller of the propulsion motor 122. In embodiments, the controller 152 can be configured to turn, change the rotational direction of, and/or change the rotational speed of the propeller by controlling the steering assembly and/or actuator based on control signals received from the control system 200. In some embodiments, the controller 152 itself is configured to generate the control signals or a portion thereof based on communication data (e.g., measurements, user inputs, etc.) received from the control system 200.

In some embodiments, the control system 200 is further configured to generate one or more control signals and/or configured to communication data (e.g., measurements, user inputs, etc.) to a thruster 124. The thruster 124 may include or may be coupled with a receiver/transceiver (or in some embodiments, a receiver and a transmitter) configured to receive the control signals and/or other communications from the control system 200. For example, the receiver/transceiver can be communicatively coupled to the control system 200 via a wired or wireless connection. The thruster 124 may also include or may be coupled with a controller 172, which may include components and/or circuitry as described above with regard to controller 202. The controller 172 can be configured to control an actuator (e.g., motor) that drives the propeller of the thruster 124. In embodiments, the controller 172 can be configured to change the rotational direction of and/or change the rotational speed of the propeller by controlling the actuator based on control signals received from the control system 200. In some embodiments, the controller 172 itself is configured to generate the control signals or a portion thereof based on communication data (e.g., measurements, user inputs, etc.) received from the control system 200.

Figure 13:
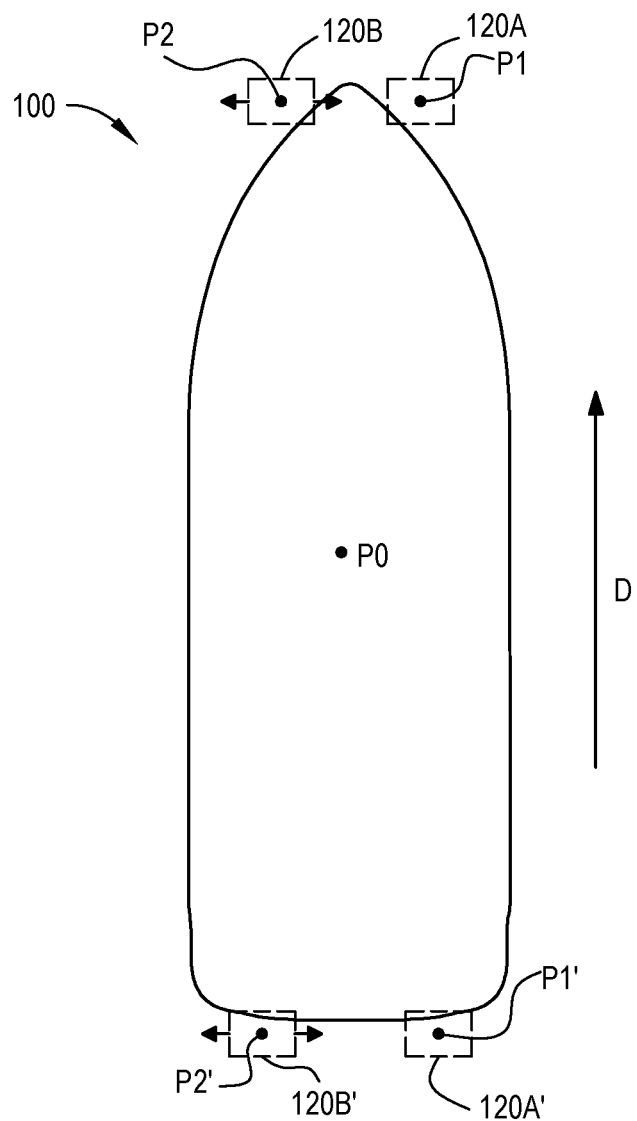
FIG. 13 is a plan view of a marine vessel.

FIG. 13 is a plan view of a marine vessel consistent with the present teachings. In an embodiment, the control system 200 is configured to control at least two trolling motors 120 (e.g., trolling motor 120A and 120B) based on position and orientation measurements for the marine vessel 100. For example, the trolling motors 120A and 120B can be front-mounted, rear-mounted (e.g., trolling motor 120A' and 120B'), or at least one trolling motor (e.g., trolling motor 120A or 120B) can be front-mounted and at least one trolling motor (e.g., trolling motor 120B' or 120A') can be rear-mounted. The control system 200 is configured to receive at least one position measurement for the marine vessel 100. For example, the control system 200 can be configured to receive a position measurement P0 from the LIDAR sensing system 220 of the control system 200. In some embodiments, the control system 200 is configured to receive a position measurement P1 or P1' from the trolling motor 120A or 120A' (e.g., from location determining component 140). The control system 200 is configured to generate one or more control signals for the trolling motor 120A or 120A' based on the position measurement (e.g., position measurement P0, P1, or P1'). In an embodiment, the control system 200 can be configured to cause the trolling motor 120 to actuate the marine vessel 100 in a direction and/or speed to cause a reference point (e.g., center) of the marine vessel 100 to be at a location corresponding to position measurement P0. In another embodiment, the control system 200 can be configured to cause the trolling motor 120A or 120A' to actuate the marine vessel 100 (and/or the trolling motor 120A or 120A' itself) to cause the trolling motor 120A or 120A' to be at a location corresponding to position measurement P1 or P1'.

While the position P0, P1, or P1' is maintained, the marine vessel 100 may rotated or pivot about the position due to wind, water current, or other forces on the marine vessel 100. To maintain the marine vessel 100 in a fixed or substantially fixed orientation, the control system 200 is further configured to control a second trolling motor (trolling motor 120B or 120B') based on an orientation measurement for the marine vessel 100. For example, the control system 200 can be configured to cause the trolling motor 120B or 120B' to actuate the bow 104 or stern 110 of the marine vessel in a first or second direction (e.g., to the right or left) in order to control (e.g., maintain) the orientation of the marine vessel 100. The control system 200 is configured to receive at least one orientation measurement for the marine vessel 100. For example, the control system 200 can be configured to receive an orientation measurement (e.g., a heading or direction D in which the marine vessel 100 is pointed) from the magnetometer 218 of the control system 200. In some embodiments, the control system 200 is configured to receive an orientation measurement (e.g., direction D) from the trolling motor 120B or 120B' (e.g., from magnetometer 142). In other embodiments, the orientation measurement is based on at least one additional position measurement. For example, the orientation measurement can be based on a vector defined by any two of P0, P1, P2, P1', or P2', or a second position measurement P2 or P2' in addition to P1 or P1'. The control system 200 is configured to generate one or more control signals for the trolling motor 120B or 120B' based on the orientation measurement (e.g., direction D, vector coordinates, or position measurement P2 or P2'). In an embodiment, the control system 200 can be configured to cause the second trolling motor 120B or 120B' to actuate the marine vessel 100 in a first direction or a second direction (e.g., to the right or left) to cause the vessel 100 to maintain its direction D or vector coordinates (e.g., any two of P0, P1, P2, P1', or P2'). In another embodiment, the control system 200 is configured to cause the second trolling motor 120B or 120B' to actuate the marine vessel 100 (and/or the second trolling motor 120B or 120B' itself) to cause the second trolling motor 120B or 120B' to be at a location corresponding to position measurement P2 or P2'.

Figure 14:
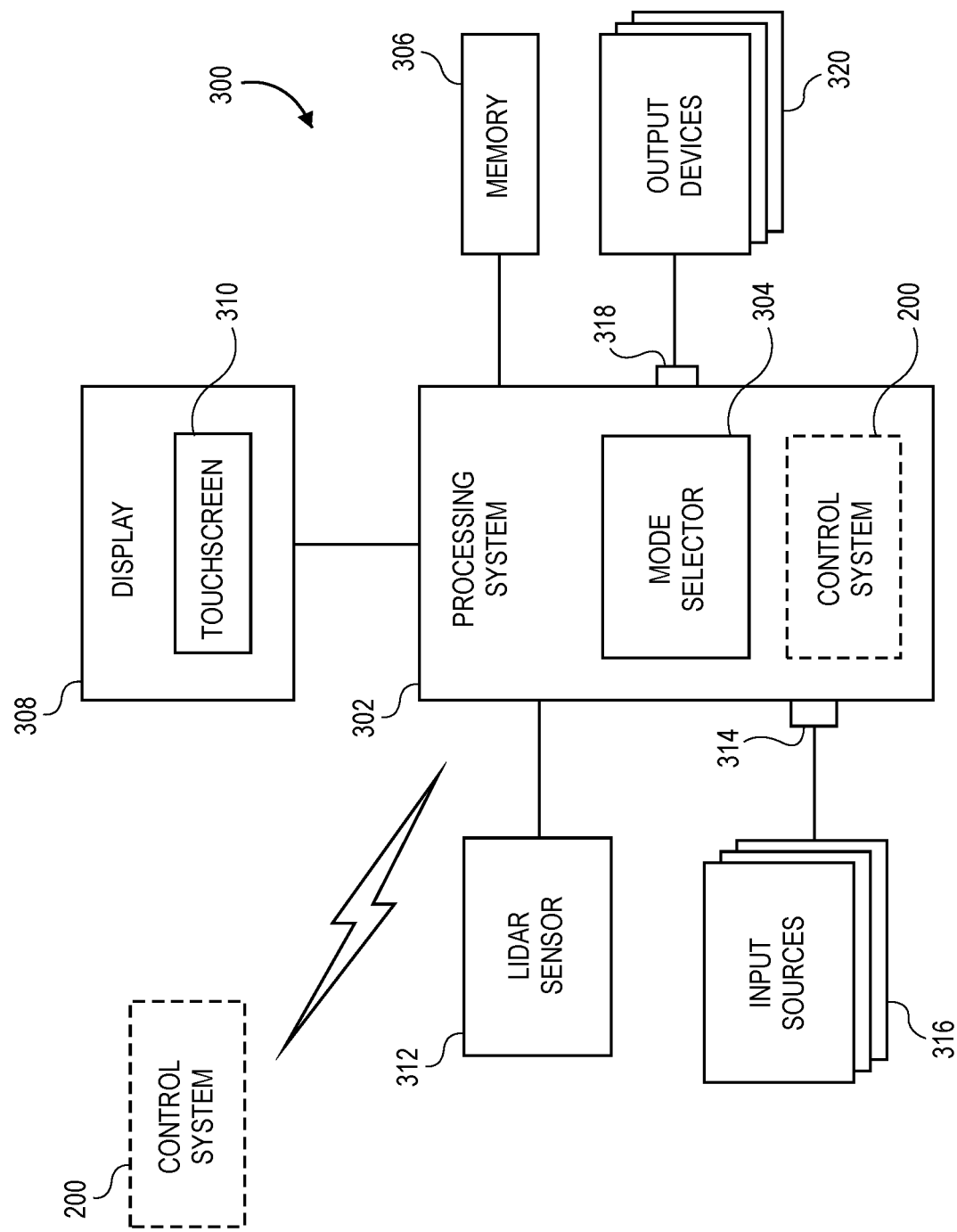
FIG. 14 is an overall block diagram of a marine vessel navigation system.

FIG. 14 is an overall block diagram of a marine vessel navigation system consistent with the present teachings. In various embodiments, the marine vessel display system 300 can include at least one input 314 for receiving data from one or more marine input sources 316; a display 308 for presenting information representative of at least some of the data from the marine input sources 316; and a processing system 302 in communication with the inputs 314 and the display 308. As described in more detail below, the processing system 302 may implement a plurality of modes of operation, each of which may cause the display 308 to present information representative of data from predetermined ones of the marine input sources 316 and in selected formats. The marine vessel display system 300 may further comprise a LIDAR sensing system 312 that furnishes distance data for the marine vessel 300. The processing system 302 may implement a mode selector 304 configured to select between a plurality of modes of operation, respective ones of which present information representative of data from selected marine input sources 316 on the display 308. The processing system 302 may further be configured to cause at least one of automatic activation or deactivation of an equipment of the marine vessel (e.g., turn on a fish finder, start a trolling motor, activate an anchor system, start or shut down the engines of the marine vessel, activate a navigation system, etc.) during selection of a particular mode of operation. In an embodiment, the processing system 302 is coupled to and/or includes the control system 200 that is configured to control the two or more motors (e.g., trolling motor(s) 120, propulsion motor(s) 122, and/or thruster(s) 124) of the marine vessel 100.

The input 314 may be any wireless or wired device or devices for receiving data from the marine input sources 316 and transferring the data to the processing system 302. The input 314 may comprise, for example, one or more Ethernet ports, Universal Serial Bus (USB) Ports, High Definition Multi-Media Interface (HDMI) ports, memory card slots, video ports, radio frequency (RF) receivers, infrared (IR) receivers, Wi-Fi receivers, Bluetooth devices, and so forth.

The marine input sources 316 may provide data to the processing system 302 and may comprise any measurement devices, sensors, receivers, or other components that sense, measure, or otherwise monitor components of the marine vessel 300 or its surroundings. For example, the marine input sources 316 may include sensors that measure or sense vessel fuel level, wind speed, wind direction, vessel temperature, ambient temperature, water current speed, rudder position, an azimuth thruster position, water depth, boat water storage level, anchor status, boat speed, combinations thereof, and the like.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. An electronic system for use in connection with navigating a marine vessel to a desired position along a waterline boundary:
    a display;
    a light detection ranging ("LIDAR") sensing system configured to detect structure in a region by vertically scanning the region, the structure comprising the waterline boundary;
    a memory element configured to store characteristics of the detected structure;
    a processing element coupled with the LIDAR sensing system and the memory element, the processing element configured to:
        determine, and store in the memory element, a characteristic of the detected structure,
        identify a primary reference point associated with navigation of the marine vessel to the desired position based on the determined characteristic of the detected structure, and
        control the display to present information related to a current position of the marine vessel in relation to the identified primary reference point and the desired position along the waterline boundary.

2. The electronic system of claim 1, wherein the LIDAR sensing system comprises an array of LIDAR sensors.

3. The electronic system of claim 1, wherein the determined characteristic of the detected structure is an edge of a dock.

4. The electronic system of claim 1, wherein the LIDAR sensing system includes at least one stern LIDAR sensor that operates as a backup sensor to enable the marine vessel to accurately navigate in a rearwards direction.

5. The electronic system of claim 4, wherein the stern LIDAR sensor is configured to detect objects to the rear of the marine vessel that are at risk of being struck by the propeller of the marine vessel.

6. The electronic system of claim 1, wherein the processing element is further configured to:
    identify at least one secondary reference point having a consistent positive linear correlation to the primary reference point.

7. The electronic system of claim 1, wherein the processing element is further configured to:
    continually determine a distance between the primary and secondary reference points and if differences in subsequent measurements of the primary reference point exceed a measurement threshold, then to use the secondary reference point for navigation based on the previously determined distance between the primary and secondary reference points.

8. The electronic system of claim 1, wherein the processing element is further configured to:
    calculate a needed thrust vector to attain the desired position.

9. The electronic system of claim 1, wherein the LIDAR sensing system comprises a micro-electromechanical mirror system ("MEMS array") and a detector for detecting a return LIDAR signal as steered by the MEMS array.

10. The electronic system of claim 9, wherein the MEMS array is a digital light processing ("DLP") projection element.

11. An electronic system for use in connection with navigating a marine vessel to a desired position along a waterline boundary:
    a display;
    a light detection ranging ("LIDAR") sensing system configured to detect structure in a region by vertically scanning the region, the structure comprising the waterline boundary;
    a memory element configured to store characteristics of the detected structure;
    a processing element coupled with the LIDAR sensing system and the memory element, the processing element configured to:

determine, and store in the memory element, a characteristic of the detected structure,
identify a primary reference point associated with navigation of the marine vessel to the desired position based on the determined characteristic of the detected structure,
control the display to present information related to a current position of the marine vessel in relation to the identified primary reference point and the desired position along the waterline boundary,
identify a secondary reference point having a linear correlation to the primary reference point, and
continually determine a distance between the primary and secondary reference points;
wherein, if differences in subsequent measurements of the primary reference point exceed a variability threshold, the processing element uses the secondary reference point for navigation based on the previously determined distance between the primary and secondary reference points.

12. The electronic system of claim 11, wherein the LIDAR sensing system comprises an array of LIDAR sensors.

13. The electronic system of claim 11, wherein the determined characteristic of the detected structure is an edge of a dock.

14. The electronic system of claim 11, wherein the LIDAR sensing system includes at least one stern LIDAR sensor that operates as a backup sensor to enable the marine vessel to accurately navigate in a rearwards direction.

15. The electronic system of claim 11, wherein the processing element is further configured to:
calculate a needed thrust vector to attain the desired position.

16. The electronic system of claim 11, wherein the LIDAR sensing system comprises a micro-electromechanical mirror system ("MEMS array") and a detector for detecting a return LIDAR signal as steered by the MEMS array.

17. The electronic system of claim 16, wherein the MEMS array is a digital light processing ("DLP") projection element.

18. An electronic system for use in connection with navigating a marine vessel to a desired position along a waterline boundary:
a display;
a light detection ranging ("LIDAR") sensing system configured to detect structure of an edge of a dock in a region by vertically scanning the region, the structure comprising the waterline boundary;
a memory element configured to store characteristics of the detected structure;
a processing element coupled with the LIDAR sensing system and the memory element, the processing element configured to:
determine, and store in the memory element, a characteristic of the detected structure,
identify a primary reference point associated with navigation of the marine vessel to the desired position based on the determined characteristic of the detected structure,
control the display to present information about a current position of the marine vessel in relation to the desired position,
identify a secondary reference point having a linear correlation to the primary reference point, and
continually determine a distance between the primary and secondary reference points;
wherein, if differences in subsequent measurements of the primary reference point exceed a variability threshold, the processing element uses the secondary reference point for navigation based on the previously determined distance between the primary and secondary reference points.

19. The electronic system of claim 18, wherein the LIDAR sensing system comprises a micro-electromechanical mirror system ("MEMS array") and a detector for detecting a return LIDAR signal as steered by the MEMS array.

20. The electronic system of claim 19, wherein the MEMS array is a digital light processing ("DLP") projection element.

* * * * *